United States Patent [19]
Hitz et al.

[11] Patent Number: 6,138,126
[45] Date of Patent: Oct. 24, 2000

[54] METHOD FOR ALLOCATING FILES IN A FILE SYSTEM INTEGRATED WITH A RAID DISK SUB-SYSTEM

[75] Inventors: David Hitz, Sunnyvale; Michael Malcolm, Los Altos; James Lau, Cupertino; Byron Rakitzis, Mountain View, all of Calif.

[73] Assignee: Network Appliance, Inc.

[21] Appl. No.: 09/359,168

[22] Filed: Jul. 21, 1999

Related U.S. Application Data

[63] Continuation of application No. 08/464,591, May 31, 1995.
[51] Int. Cl.$^7$ .................................................. G06F 17/30
[52] U.S. Cl. ......................................... 707/202; 707/203
[58] Field of Search .................. 707/1, 5, 10, 100–104, 707/200–206

[56] References Cited

U.S. PATENT DOCUMENTS

| | | |
|---|---|---|
| 5,504,883 | 4/1996 | Coverston et al. . |
| 5,675,782 | 10/1997 | Misra et al. . |
| 5,720,029 | 2/1998 | Kern et al. . |
| 5,819,292 | 10/1998 | Hitz et al. ............................... 707/203 |
| 5,963,962 | 10/1999 | Hitz et al. ............................... 707/202 |

FOREIGN PATENT DOCUMENTS

| | | |
|---|---|---|
| 0306244A2 | 3/1989 | European Pat. Off. . |
| 0308056A2 | 3/1989 | European Pat. Off. . |
| 0410630A | 1/1991 | European Pat. Off. . |
| 0 477 039 | 3/1992 | European Pat. Off. . |
| 0566967A | 10/1993 | European Pat. Off. . |
| 0760503A1 | 3/1997 | European Pat. Off. . |

OTHER PUBLICATIONS

R. Reichel: "Inside Windows NT Security: Part 1" Windows/DOS Developers' Journal, vol. 4, No. 4, Apr. 1993, pp. 6–19, XP002107445, Lawrence, Ks, USA.

"Mapping the VM text files to the AIX text files", IBM Technical Disclosure Bulletin, vol. 33, No. 2, Jul. 1990 (1990–07), p. 341 XP000123641, IBM Corp. New York, US ISSN: 0018–8689—the whole document.

"Migrated Data Backup Utility", IBM Technical Disclosure Bulletin, vol. 37, No. 06B, Jun. 1994 (1994–06), pp. 505–507, XP000456079, IBM Corp. New York, US ISSN: 0018–8689.

*Primary Examiner*—Ruay Lian Ho
*Attorney, Agent, or Firm*—Swernofsky Law Group

[57] ABSTRACT

A method is disclosed for integrating a file system with a RAID array that exports precise information about the arrangement of data blocks in the RAID subsystem. The file system examines this information and uses it to optimize the location of blocks as they are written to the RAID system. Thus, the system uses explicit knowledge of the underlying RAID disk layout to schedule disk allocation. The method uses separate current-write location (CWL) pointers for each disk in the disk array where the pointers simply advance through the disks as writes occur. The algorithm used has two primary goals. The first goal is to keep the CWL pointers as close together as possible, thereby improving RAID efficiency by writing to multiple blocks in the stripe simultaneously. The second goal is to allocate adjacent blocks in a file on the same disk, thereby improving read back performance. The method satisfies the first goal by always writing on the disk with the lowest CWL pointer. For the second goal, a new disks chosen only when the algorithm starts allocating space for a new file, or when it has allocated N blocks on the same disk for a single file. A sufficient number of blocks is defined as all the buffers in a chunk of N sequential buffers in a file. The result is that CWL pointers are never more than N blocks apart on different disks, and large files have N consecutive blocks on the same disk.

7 Claims, 18 Drawing Sheets

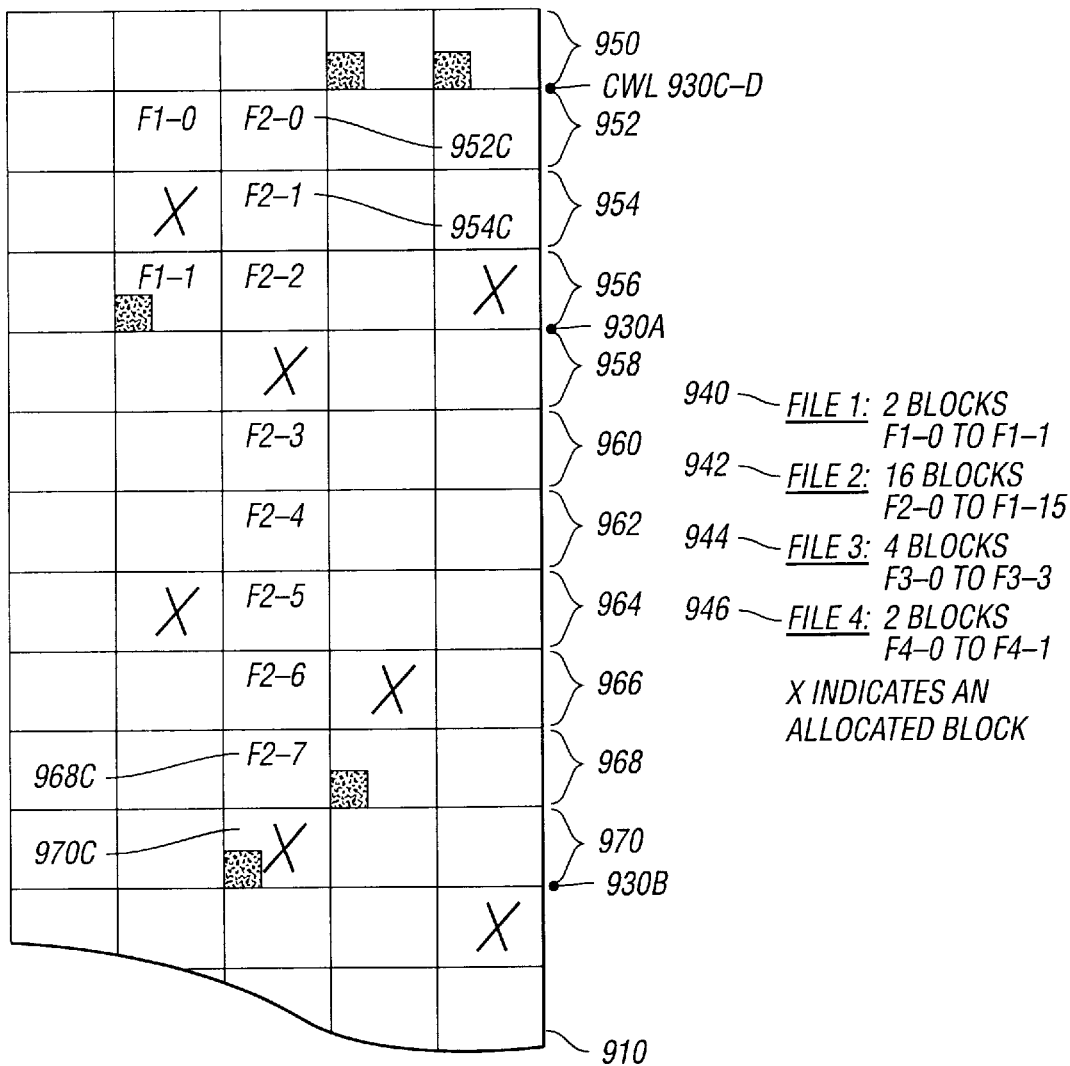
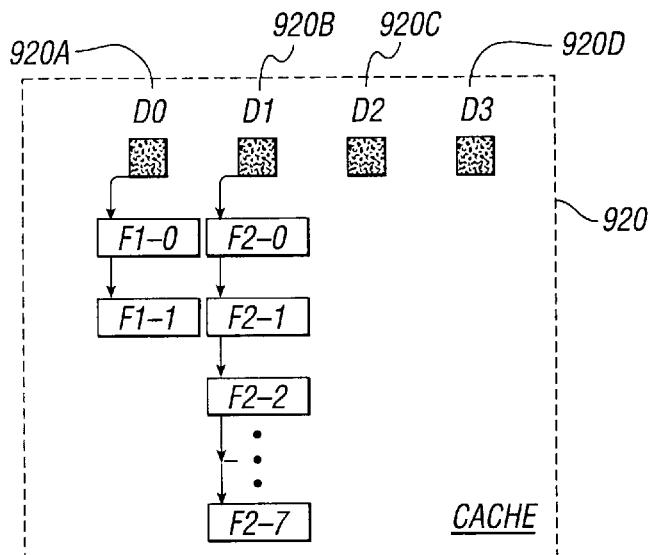
FIG. 9C

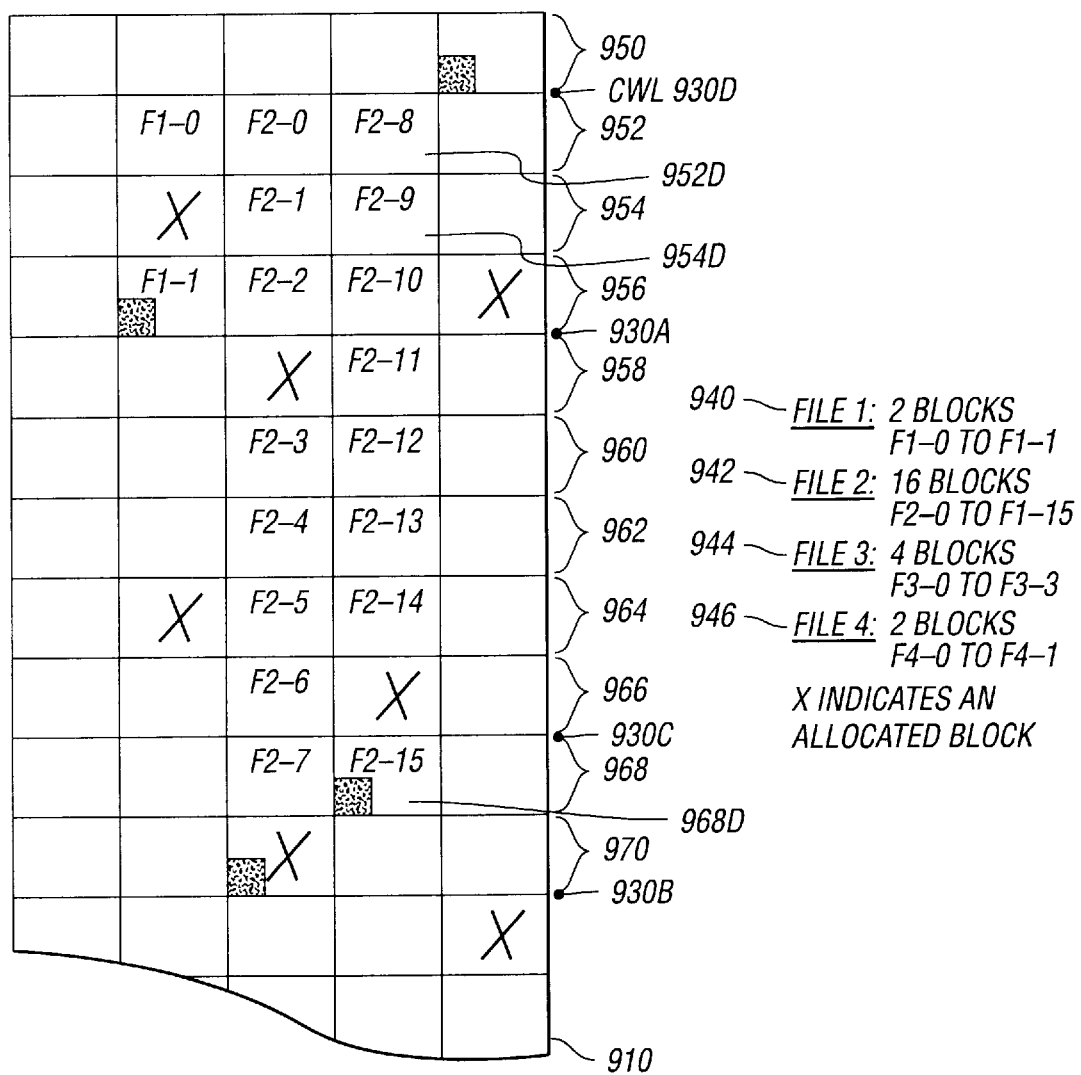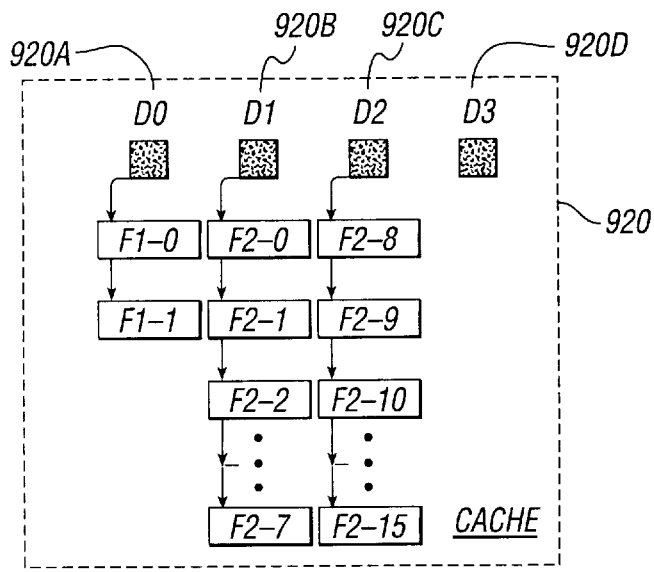
FIG. 9D

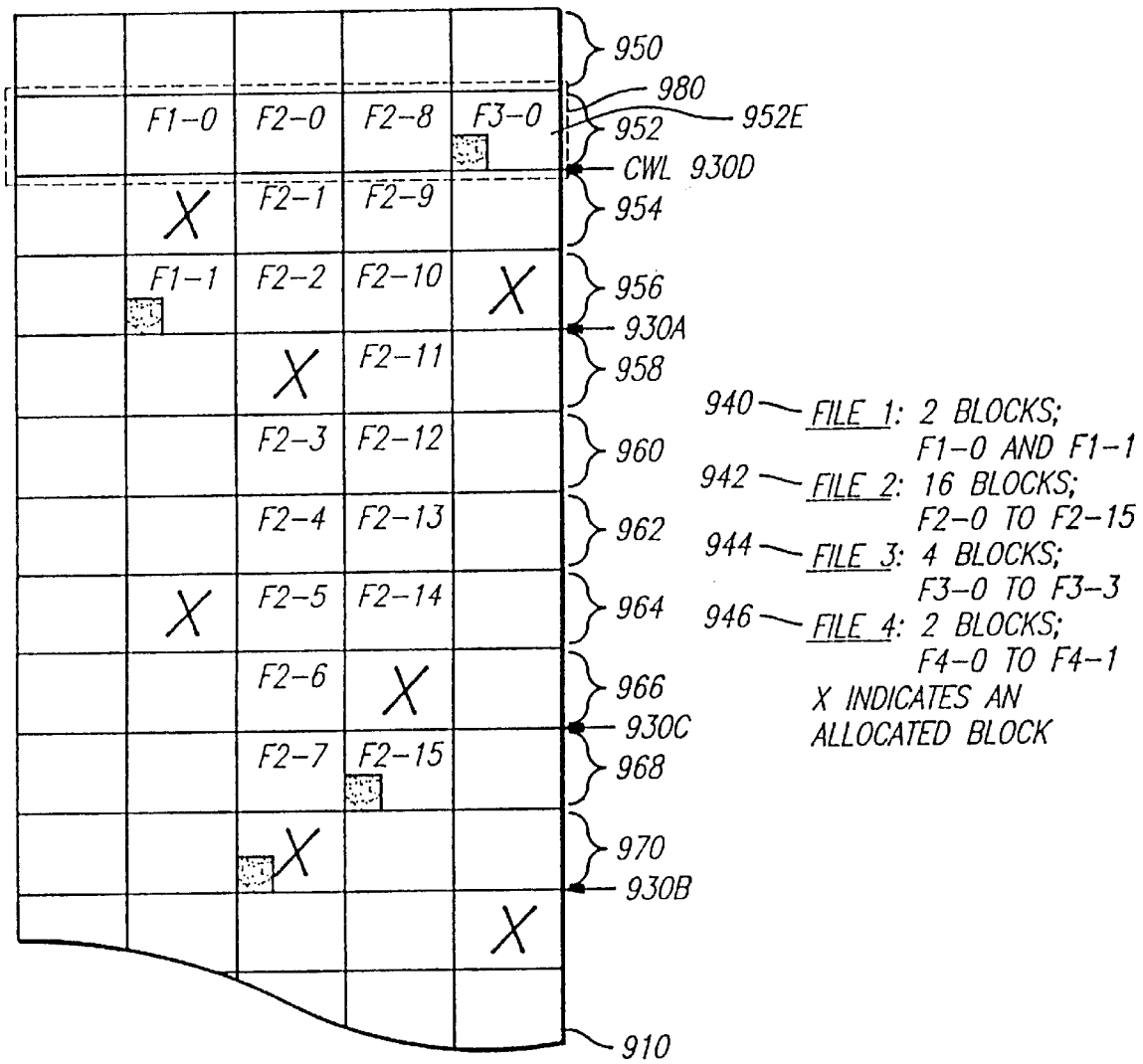
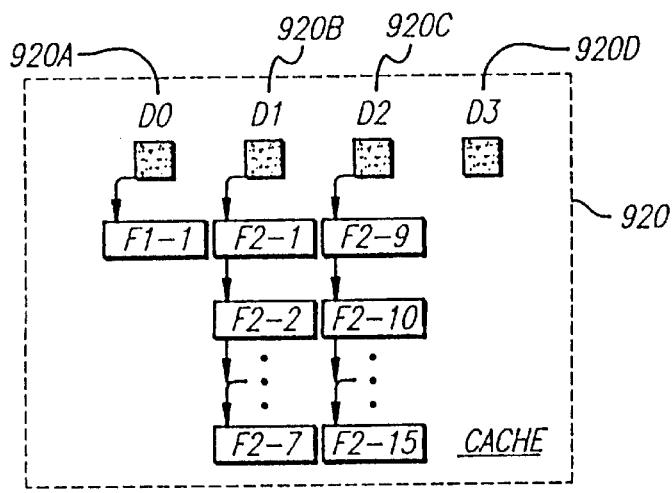
FIG. 9E

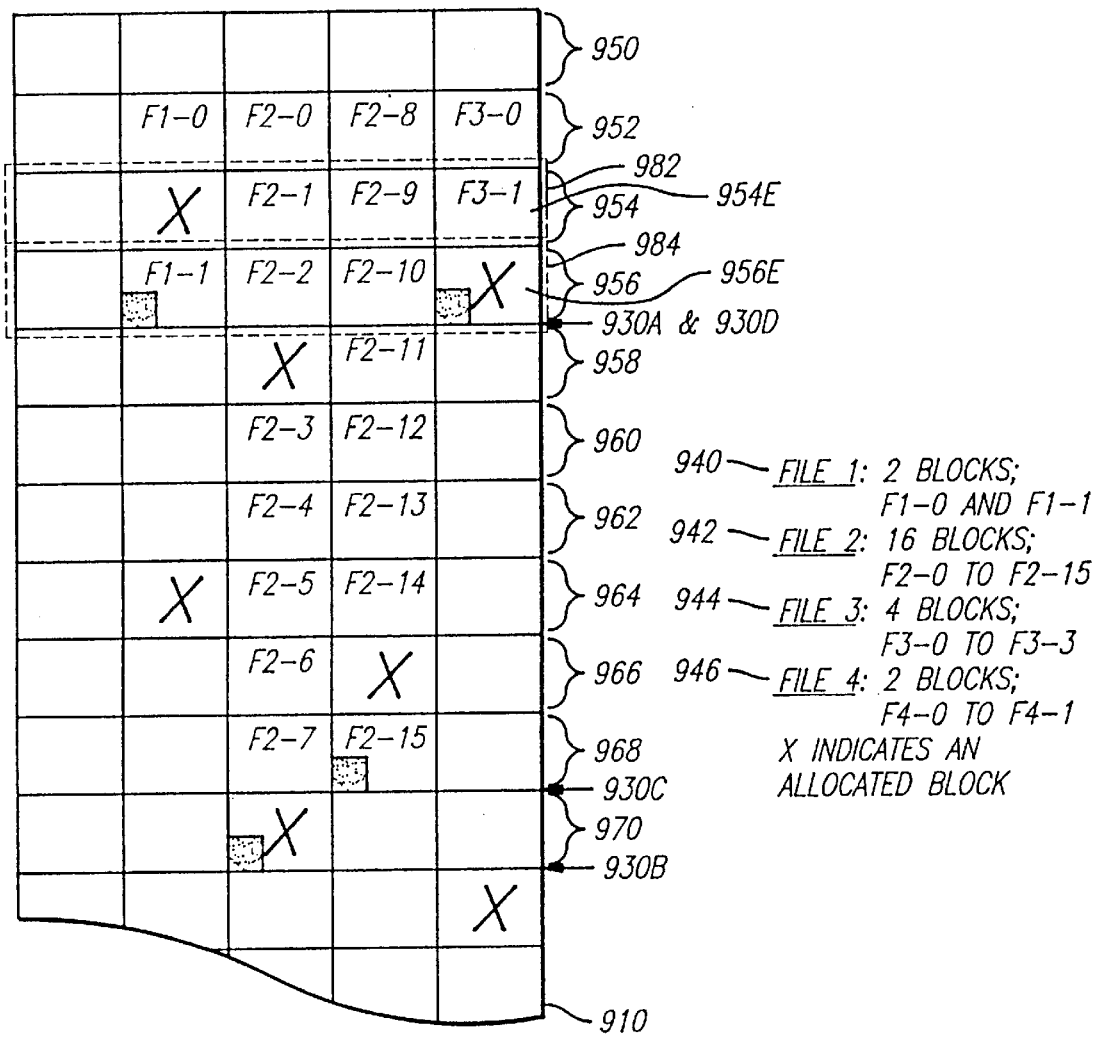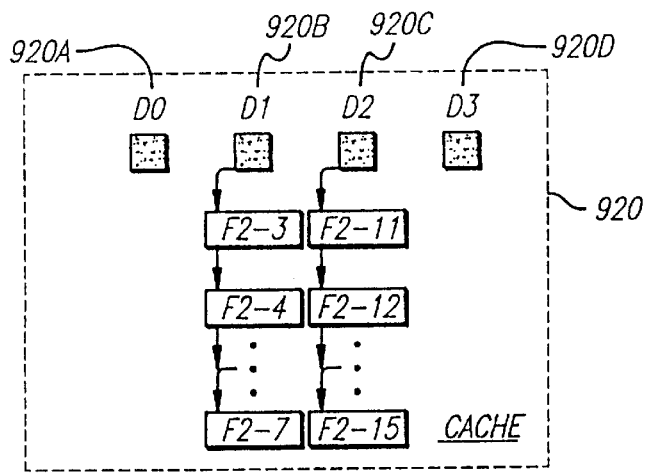
FIG. 9F

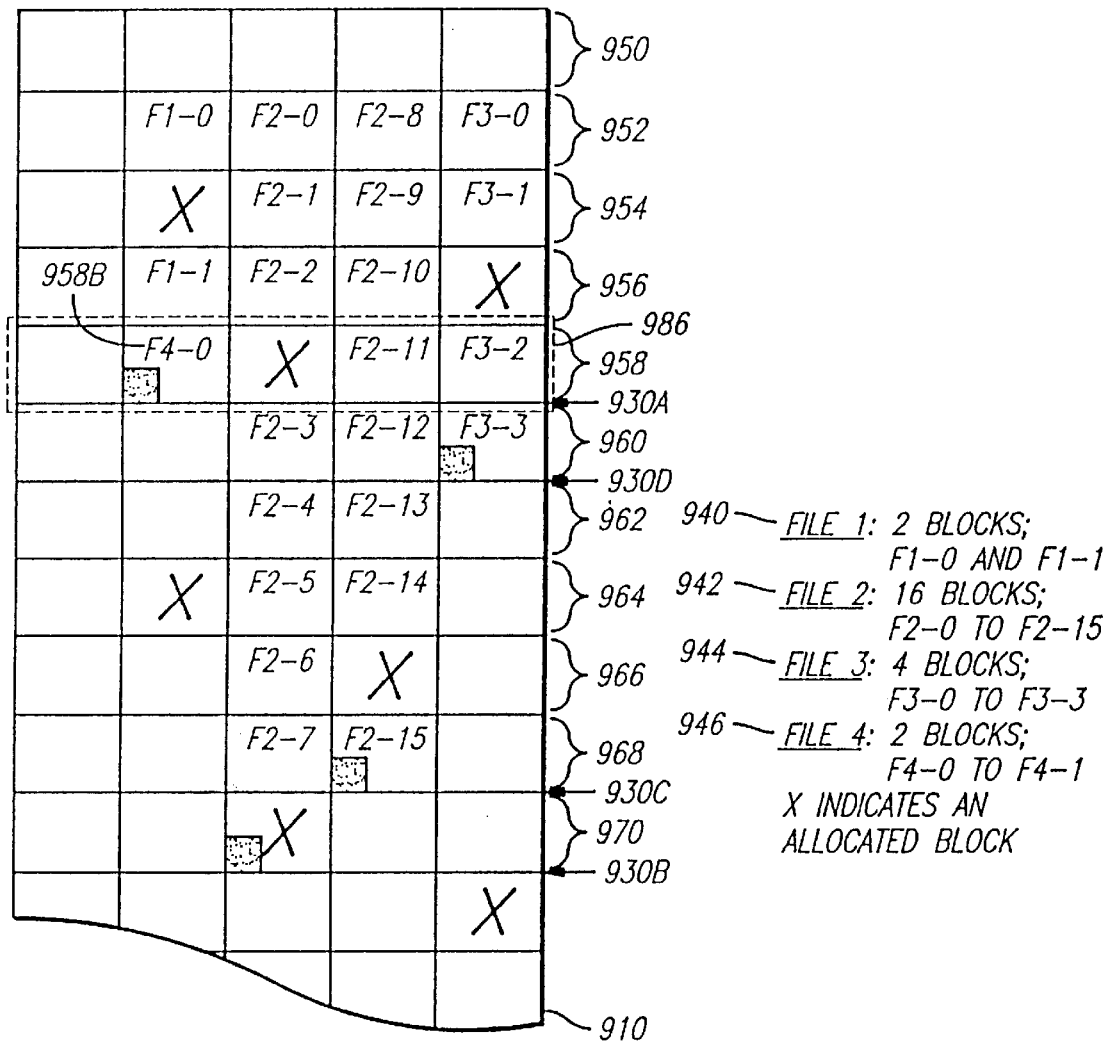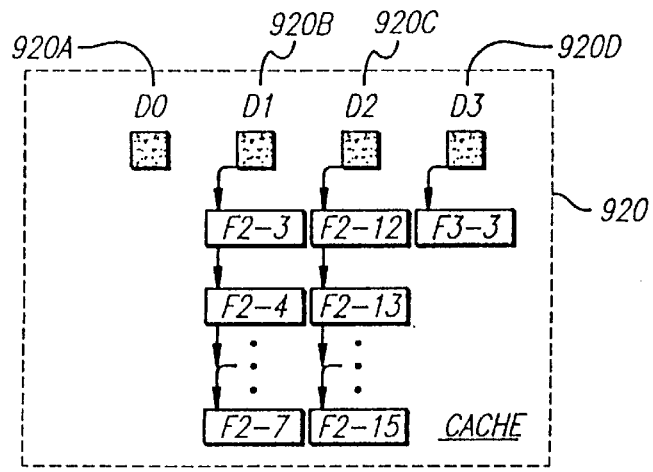
FIG. 9H

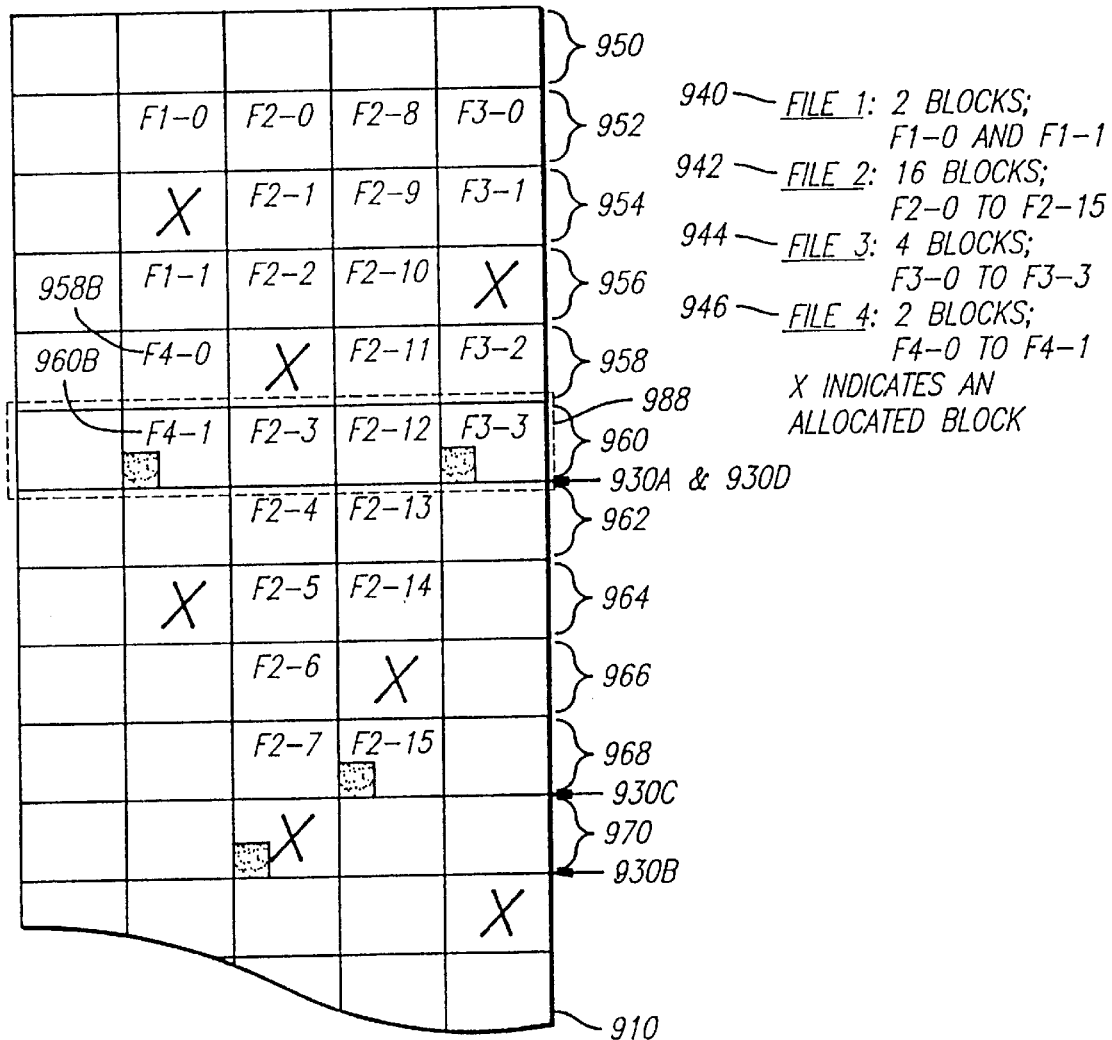
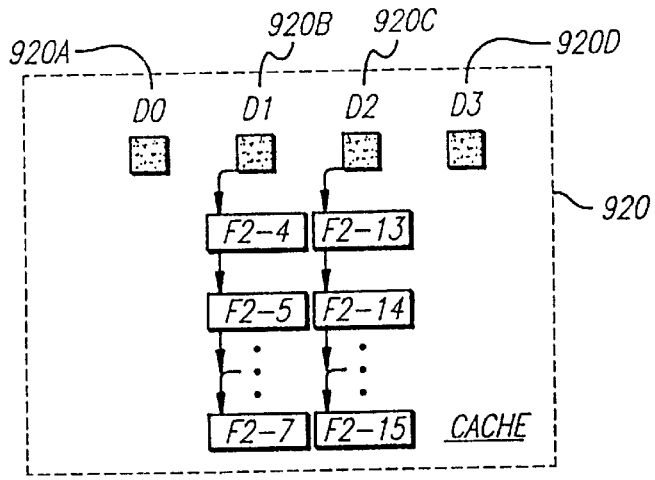
FIG. 91

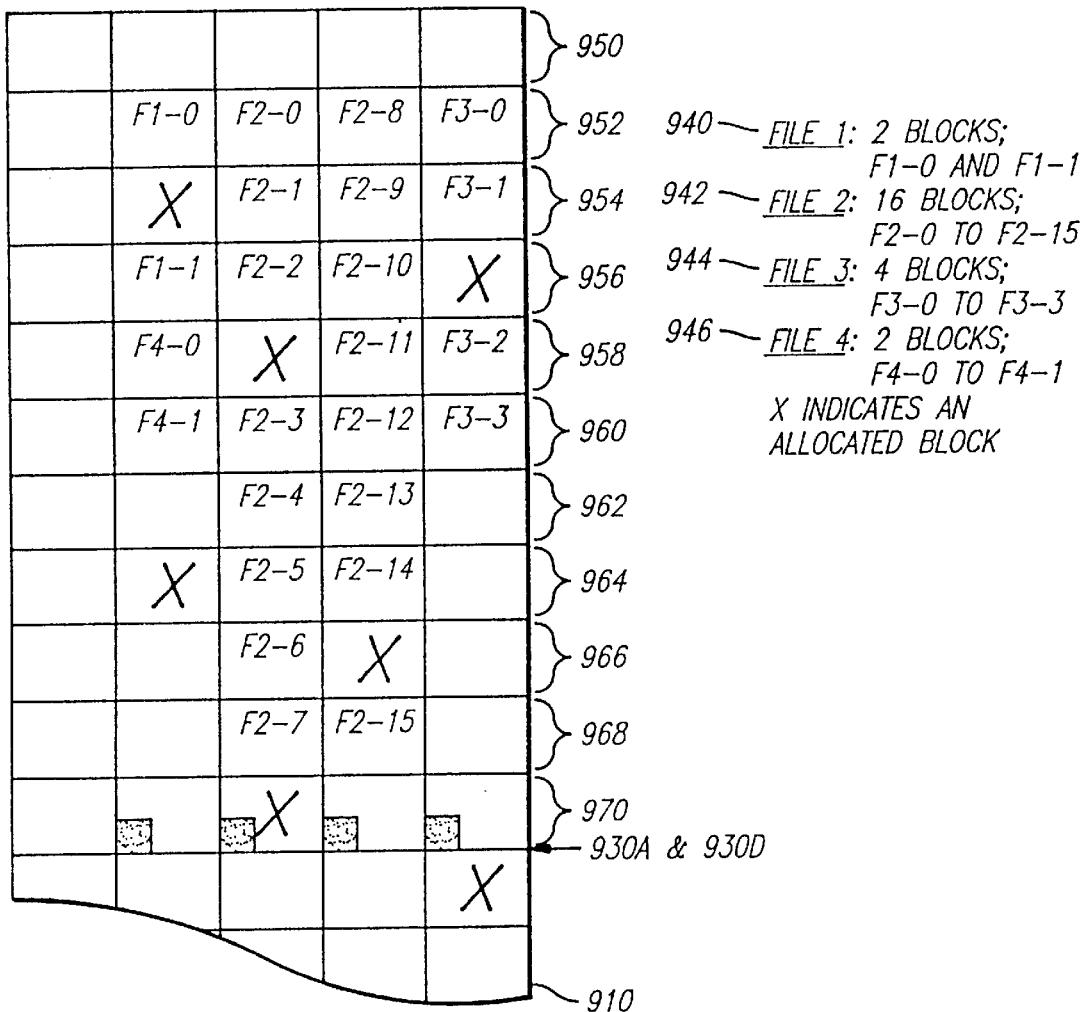
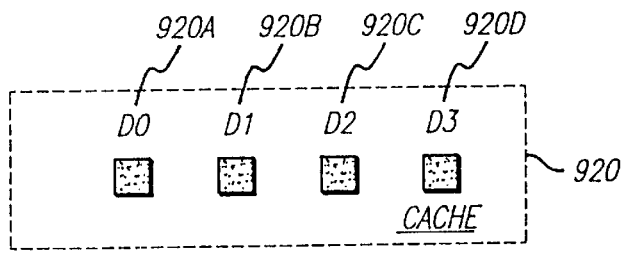
FIG. 9J

METHOD FOR ALLOCATING FILES IN A FILE SYSTEM INTEGRATED WITH A RAID DISK SUB-SYSTEM This application is a continuation of Ser. No. 08/464,591 filed May 31, 1995.

BACKGROUND OF THE INVENTION

1. Field of the Invention

The present invention is related to the field of file systems using disk arrays for storing information.

2. Background Art

A computer system typically requires large amounts of secondary memory, such as a disk drive, to store information (e.g. data and/or application programs). Prior art computer systems often use a single "Winchester" style hard disk drive to provide permanent storage of large amounts of data. As the performance of computers and associated processors has increased, the need for disk drives of larger capacity, and capable of high speed data transfer rates, has increased. To keep pace, changes and improvements in disk drive performance have been made. For example, data and track density increases, media improvements, and a greater number of heads and disks in a single disk drive have resulted in higher data transfer rates.

A disadvantage of using a single disk drive to provide secondary storage is the expense of replacing the drive when greater capacity or performance is required. Another disadvantage is the lack of redundancy or back up to a single disk drive. When a single disk drive is damaged, inoperable, or replaced, the system is shut down.

One prior art attempt to reduce or eliminate the above disadvantages of single disk drive systems is to use a plurality of drives coupled together in parallel. Data is broken into chunks that may be accessed simultaneously from multiple drives in parallel, or sequentially from a single drive of the plurality of drives. One such system of combining disk drives in parallel is known as "redundant array of inexpensive disks" (RAID). A RAID system provides the same storage capacity as a larger single disk drive system, but at a lower cost. Similarly, high data transfer rates can be achieved due to the parallelism of the array.

RAID systems allow incremental increases in storage capacity through the addition of additional disk drives to the array. When a disk crashes in the RAID system, it may be replaced without shutting down the entire system. Data on a crashed disk may be recovered using error correction techniques.

RAID has six disk array configurations referred to as RAID level 0 through RAID level 5. Each RAID level has advantages and disadvantages. In the present discussion, only RAID levels 4 and 5 are described. However, a detailed description of the different RAID levels is disclosed by Patterson, et al. in *A Case for Redundant Arrays of Inexpensive Disks (RAID)*, ACM SIGMOD Conference, June 1998. This article is incorporated by reference herein.

FIG. 1 is a block diagram illustrating a prior art system implementing RAID level 4. The system comprises one parity disk 112 and N data disks 112–118 coupled to a computer system, or host computer, by communication channel 130. In the example, data is stored on each hard disk in 4 KByte blocks or segments. Disk 112 is the Parity disk for the system, while disks 114–118 are Data disks 0 through N–1. RAID level 4 uses disk striping that distributes blocks of data across all the disks in an array as shown in FIG. 1. This system places the first block on the first drive and cycles through the other N–1 drives in sequential order. RAID level 4 uses an extra drive for parity that includes error-correcting information for each group of data blocks referred to as a stripe. Disk striping as shown in FIG. 1 allows the system to read or write large amounts of data at once. One segment of each drive can be read at the same time, resulting in faster data accesses for large files.

In a RAID level 4 system, files comprising a plurality of blocks are stored on the N data disks 112–118 in a "stripe." A stripe is a group of data blocks wherein each block is stored on a separate disk of the N disks. In FIG. 1, first and second stripes 140 and 142 are indicated by dotted lines. The first stripe 140 comprises Parity 0 block and data blocks 0 to N–1. In the example shown, a first data block 0 is stored on disk 114 of the N disk array. The second data block 1 is stored on disk 116, and so on. Finally, data block N–1 is stored on disk 118. Parity is computed for stripe 140, using techniques well-known to a person skilled in the art, and is stored as Parity block 0 on disk 112. Similarly, stripe 142 comprising N–1 data blocks is stored as data block N on disk 114, data block N+1 on disk 116, and data block 2N–1 on disk 118. Parity is computed for the 4 stripe 142 and stored as parity block 1 on disk 112.

As shown in FIG. 1, RAID level 4 adds an extra parity disk drive containing error-correcting information for each stripe in the system. If an error occurs in the system, the RAID array must use all of the drives in the array to correct the error in the system. Since a single drive usually needs to be accessed at one time, RAID level 4 performs well for reading small pieces of data. A RAID level 4 array reads the data it needs with the exception of an error. However, a RAID level 4 array always ties up the dedicated parity drive when it needs to write data into the array.

RAID level 5 array systems use parity as does RAID level 4 systems. However, it does not keep all of the parity sectors on a single drive. RAID level 5 rotates the position of the parity blocks through the available disks in the disk array of N disk. Thus, RAID level 5 systems improve on RAID 4 performance by spreading parity data across the N–1 disk drives in rotation, one block at a time. For the first set of blocks, the parity block might be stored on the first drive. For the second set of blocks, it would be stored on the second disk drive. This is repeated so that each set has a parity block, but not all of the parity information is stored on a single disk drive. Like a RAID level 4 array, a RAID level 5 array just reads the data it needs, barring an error. In RAID level 5 systems, because no single disk holds all of the parity information for a group of blocks, it is often possible to write to several different drives in the array at one instant. Thus, both reads and writes are performed more quickly on RAID level 5 systems than RAID 4 array.

FIG. 2 is a block diagram illustrating a prior art system implementing RAID level 5. The system comprises one parity disk 212 and N data disks 214–218 coupled to a computer system or host computer 120 by communication channel 130. In stripe 240, parity block 0 is stored on the first disk 212. Data block 0 is stored on the second disk 214, data block 1 is stored on the third disk 216, and so on. Finally, data block N–1 is stored on disk 218. In stripe 212, data block N is stored on the first disk 212. The second parity block 1 is stored on the second disk 214. Data block N+1 is stored on disk 216, and so on. Finally, data block 2N–1 is stored on disk 218. In M–1 stripe 244, data block MN–N is stored on the first disk 212. Data block MN–N+1 is stored on the second disk 214. Data block MN–N+2 is stored on the third disk 216, and so on. Finally, parity block M–1 is stored on the nth disk 218. Thus, FIG. 2 illustrates that RAID level 5 systems store the same parity information as RAID level 4 systems, however, RAID level 5 systems rotate the positions of the parity blocks through the available disks 212–218.

In RAID level 5, parity is distributed across the array of disks. This leads to multiple seeks across the disk. It also inhibits simple increases to the size of the RAID array since a fixed number of disks must be added to the system due to parity requirements.

For a prior art file system operating on top of a RAID subsystem, it tends to treat the RAID array as a large collection of blocks wherein each block is numbered sequentially across the RAID array. The data blocks of a file are then scattered across the data disks to fill each stripe as fully as possible, thereby placing each data block in a stripe on a different disk. Once N data blocks of a first stripe are allocated to N data disks of the RAID array, remaining data blocks are allocated on subsequent stripes in the same fashion until the entire file is written in the RAID array. Thus, a file is written across the data disks of a RAID system in stripes comprising modulo N data blocks. This has the disadvantage of requiring a single file to be accessed across up to N disks, thereby requiring N disks seeks. Consequently, some prior art file systems attempt to write all the data blocks of a file to a single disk. This has the disadvantage of seeking a single data disk all the time for a file, thereby under-utilizing the other N–1 disks.

Typically, a file system has no information about the underlying RAID subsystem and simply treats it as a single, large disk. Under these conditions, only a single data block may be written to a stripe, thereby incurring a relatively large penalty since four I/O operations are required for computing parity. For example, parity by subtraction requires four I/O operations. In a RAID array comprising four disks where one disk is a parity disk, writing three data blocks to a stripe and then computing parity for the data blocks yields 75% efficiency (three useful data writes out of four IO's total), whereas writing a single data block to a stripe has an efficiency of 25% (one useful data write out of four IO's total).

This allocation algorithm uses whole stripes as much as possible while attempting to keep a substantial portion of a file in a contiguous space on disk. The system attempts to reduce effects of randomly scattering file across disks, thereby requiring multiple disk seeks. If a 12 KByte file is stored as 4 KByte blocks on three separate disks (one stripe), three separate accesses must be scheduled to sequentially access the file. This occurs while other clients attempting to retrieve files from the file system are queued.

SUMMARY OF THE INVENTION

The present invention is a system to integrate a file system with RAID array technology. The present invention uses a RAID layer that exports precise information about the arrangement of data blocks in the RAID subsystem to the file system. The file system examines this information and uses it to optimize the location of blocks as they are written to the RAID system. The present invention uses a RAID subsystem that uses a block numbering scheme that accommodates this type of integration better than other block numbering schemes. The invention optimizes writes to the RAID system by attempting to insure good read-ahead chunks and by writing whole stripes at a time.

A method of write allocations has been developed in the file system that improves RAID performance by avoiding access patterns that are inefficient for a RAID array in favor of operations that are more efficient. Thus, the system uses explicit knowledge of the underlying RAID disk layout in order to schedule disk allocation. The present invention uses separate current-write location pointers for each of the disks in the disk array. These current-write location pointers simply advance through the disks as writes occur. The algorithm used in the present invention keeps the current-write location pointers as close to the same stripe as possible, thereby improving RAID efficiency by writing to multiple blocks in the stripe at the same time. The invention also allocates adjacent blocks in a file on the same disk, thereby improving performance as the data is being read back.

The present invention writes data on the disk with the lowest current-write location pointer. The present invention chooses a new disk only when it starts allocating space for a new file, or when it has allocated a sufficient number of blocks on the same disk for a single file. A sufficient number of blocks is defined as all the blocks in a chunk of blocks where a chunk is just some number N of sequential blocks in a file. The chunk of blocks are aligned on a modulo N boundary in the file. The result is that the current-write location pointers are never more than N blocks apart on the different disks. Thus, large files will have N consecutive blocks on the same disk.

BRIEF DESCRIPTION OF THE DRAWINGS

FIGS. 9A–9J are diagrams illustrating allocation of disk space according to FIG. 5.

DETAILED DESCRIPTION OF THE PRESENT INVENTION

A method of allocating files in a file system using RAID arrays is described. In the following description, numerous specific details, such as number and nature of pointers, disk block sizes, etc., are described in detail in order to provide a more thorough description of the present invention. It will be apparent, however, to one skilled in the art, that the present invention may be practiced without these specific details. In other instances, well-known features have not been described in detail so as not to unnecessarily obscure the present invention.

For computers used in a networking system, each hard disk operates faster than a network does. Thus, it is desirable to use independent heads in a RAID system. This enables multiple clients to simultaneously access different files stored on separate disks in the RAID array. This significantly reduces the access time for retrieving and storing data in a RAID system.

Figure 10:
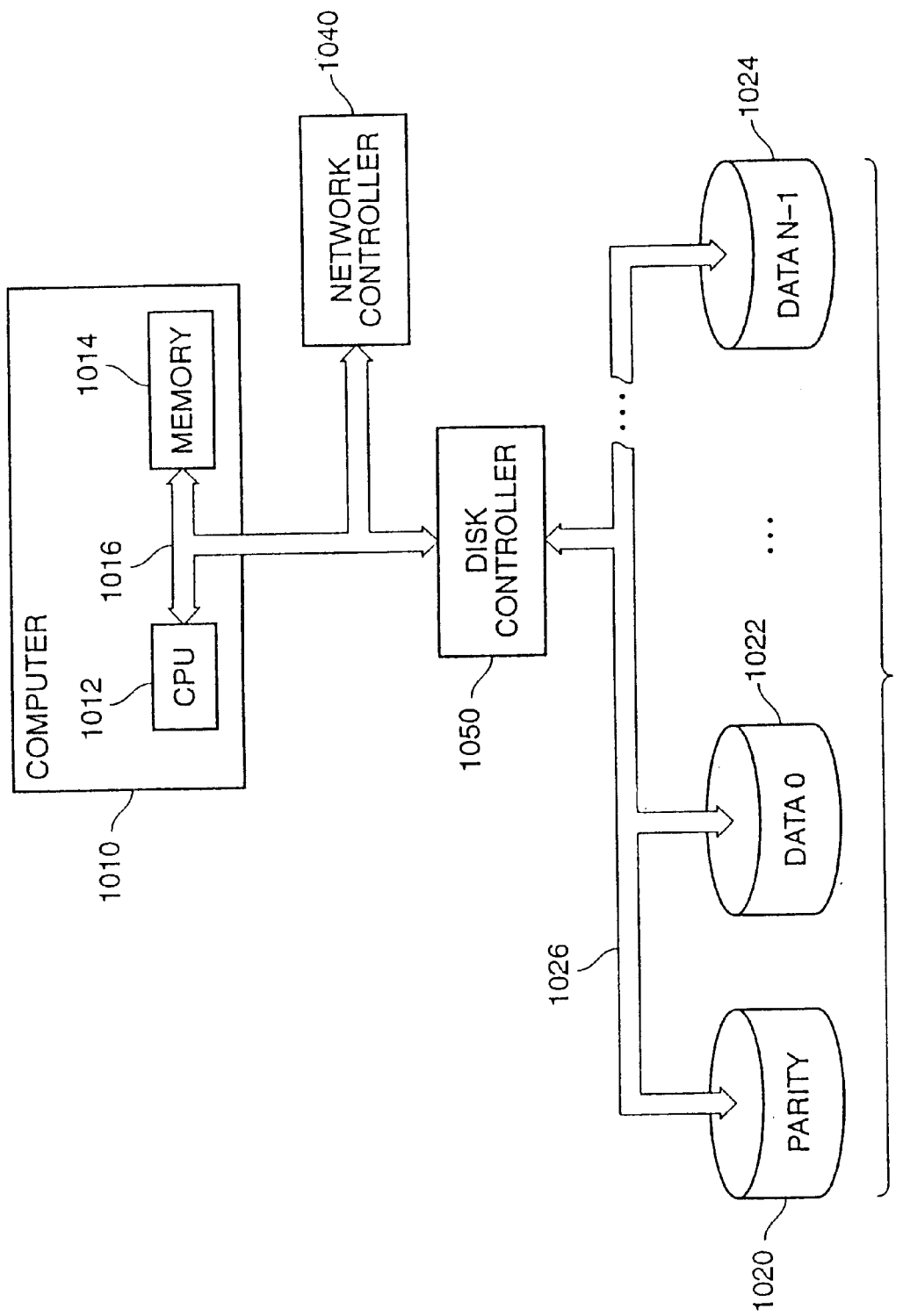
FIG. 10 is a diagram illustrating the system of the present invention.

FIG. 10 is a diagram illustrating the system of the present invention comprising a RAID sub-system. Computer 1010 comprises a central processing unit (CPU) 1012 and memory 1014. The CPU 1012 is coupled to the memory 1012 by bus 1016. Bus 1016 couples computer 1010 to RAID controller 1020. Bus 1016 also couples the computer 1010 to a network controller 1040. Raid controller 1020 is coupled to parity disk 1020 and data disks 1022 to 1024 of RAID array 1030 by bus 1026. Computer 1010 performs allocates files in a WAFL file system integrated with the RAID disk sub-system comprising RAID controller 1020 and disks 1020–1024.

The present invention provides an improved method of allocating blocks in a RAID array 1030. The system uses a RAID level 4-type array 1030 comprising N+1 disks 1030 in the RAID array including the parity disk 1020. The other N disks 1022–1024 are data disks for storing data blocks. A stripe in this RAID system comprises a plurality of 4 KByte blocks wherein each 4 KByte block is stored on a separate disk in the array. Each block in the stripe is stored at the same corresponding location on disk. In broad terms, a file is a structure for storing information wherein the data is segmented, or divided up, into blocks of a constant size. For instance, the file system of the present invention uses 4 KByte blocks for storing data on disk. However, it should be obvious to a person skilled in the art that any block size (i.e., 512, 1024, 2048 bytes, etc.) may be utilized without deviating from the scope of the present invention. Thus, for example, a 15 KByte file comprises four 4 KByte data blocks, whereas a 1 KByte file comprises a single 4 KByte data block.

In the present invention, a file comprising a plurality of data blocks is allocated in groups having a fixed number of blocks on a single disk in the RAID array. This is unlike prior art RAID systems wherein the data of a file is written across the N data disks in single bytes or in data blocks (i.e., 4 KByte blocks). In the preferred embodiment of the present invention, a file is allocated as groups of up to 8 data blocks (32 KB) on a single data disk. Thus, a file is allocated going down on an individual disk.

An important aspect of the present invention is the method for simultaneously storing data blocks in up to 32 KByte "chunks" on each disk for a maximum number of different files. Ideally, each stripe, across the plurality of disks, is filled completely by concurrently writing a data block to each of the N disks for N different files.

The concept of integrating the file system of the present invention with RAID provides knowledge of where all the arms are on all of the disks, and to control the sequence of writes as a result. So, at any one time, a maximal group of writes are executed, so that the parity disk is not "hot" and therefore is not seeking all over the RAID array. It is not "hot," which indicates a bottleneck in the system, because it has the same number of writes. In a best case scenario, all of the blocks in a stripe are empty when performing a write, thus parity is computed for three writes to three data disks, for instance. However, it is likely that one or several data blocks of a stripe may be filled since other preexisting data is stored in the raid subsystem. So in a typical file system, for example, two writes may be performed to a first stripe, single writes on a second and third stripe, and finally a triple write on a fourth stripe. Thus, four parity computations must be performed for writing seven data blocks in four stripes.

The present system attempts to write whole stripes while keeping each file on a single disk. Thus, the head on the parity disk is not seeking all over the disk. A disk can take data at higher rates if the head is sitting on a single cylinder, and not seeking across larger numbers of tracks per disk. This has the further advantage that single cylinders in disk drives store up to a quarter megabyte of data or more, thereby allowing large "chunks" of a file to be written to a single track. For example, in a file system that is 90% full, a 250 KByte cylinder is still able to store 25 KB of data. An adjacent cylinder can then be sought in a quarter revolution of the disk, and another hit occur to write another 25 KB on a single disk. For a file system that is 90% full, a file having a size that is less than 50 KB can be stored rapidly in adjacent tracks on a single disk in a RAID array. Thus, if it is known that a file is going to be stored right on down through a disk, the parity disk does not become "hot" due to seeks. It does not experience many more writes plus seeks than the other disks in the system. Each disk in the RAID array has comparable number of writes. Further, when reading, the file's queue of allocation requests will not back up behind the queues of the other disks.

There are data structures in the file system that communicate with the RAID layer. The RAID layer provides information to the file system to indicate what the RAID layer system looks like. The data structures contain an array of information about each disk in the RAID system. There is an additional reason with RAID why it is important, if possible, to write multiple file blocks to the same stripe. To update one block in a stripe requires a total of four disk operations to write the data and update parity. To update all N data blocks in a stripe takes only N+1 disk operations. The more blocks updated in a stripe at one time, the fewer disk operations occur per block of written data.

As network needs get higher than individual disk bandwidths, it is desirable to read ahead sufficiently, while accessing a file, to access another disk in advance. This is particularly useful with large files on fast networks such as FDDI and ATM.

The invention keeps a pointer for each of the disks that points to the current-write-location of each disk. The current-write-location pointer simply advances all the way through the disk until it reaches the end of the disk, and then the pointer returns to the top of the disk. For the disks of the RAID array collectively, the current-write-location points of the disks are kept as close together as possible. Thus, as blocks are being allocated down through each disk, stripes are filled up as processing occurs in the RAID array. In order to keep files contiguous on the same disk, a fixed number of blocks are allocated on the same disk.

The allocation algorithm requires a buffer for collecting a group of files so that contiguous groups of file blocks may be written to each disk while simultaneously filling stripes during processing. Thus, files are not written instantly to disk as they come into the RAID system, but are instead collected in the buffer for subsequent allocation to disk. In its simplest form, the allocation algorithm chooses a file in the buffer (randomly or otherwise) to write, locates the disk of the RAID array having a current-write-location pointer that is furthest behind the other pointers of each corresponding disk, takes a fixed group (8 blocks of 4 KB) of contiguous blocks on that disk that are available, and allocates them for the present file. In an NFS system, file requests usually arrive at a file server in units of 8 KB of data. The present invention reads ahead in 32 KByte segments that corresponds with the amount of file data that is stored contiguously on each disk. The basic concept of this method is that the amount of data to be stored contiguously on each disk corresponds to the amount of data that the algorithm reads ahead on each disk. If the blocks are not contiguous on disk, a space may exist in the middle that must be skipped to move the current-write-location pointer forward.

Blocks are sent down to the RAID subsystem by the file system in stripes when the current-write-location pointer moves beyond the current minimum. Thus, data blocks are packaged together to write as stripes to the RAID subsystem in order to obtain better system performance. This is unlike prior art systems where a RAID subsystem is attached at the bottom of an ordinary file system. These prior art systems typically attempt to optimize performance by using a large cache between the file system and the RAID subsystem layers to improve performance. The cache then attempts to locate stripes that match the file size. Thus, the RAID subsystem of the prior art cannot control or affect where the file system puts the blocks of a file. Most Unix file systems cannot put files where they want them, but instead must put them in fixed locations. Thus, for a prior art system having a one megabyte cache, it is highly unlikely that groups of data in one megabyte "chunks" (cache size) are going to line up contiguously when scattered randomly over a large RAID system of 10 gigabytes, for instance.

The present invention significantly reduces swapping between disks when accessing a single file by a factor of eight (32 KB).

Write Anywhere File-System Layout

The present invention uses a file system named Write Anywhere File-system Layout (WAFL). In broad terms, WAFL uses files to store meta-data that describes the file system layout. This file system is block-based using 4 KByte blocks with no fragments. Files in the WAFL file system are described by inodes that contain information including the size of each file, its location, its creator, as well as other file information. Thirdly, directories are simply files in this file system wherein the files have been specially formatted. Two important in-core data structures in WAFL are the WAFL inode and the WAFL buffer. The WAFL inode represents a particular file in the file system. It contains the entire on-disk inode as well as other information. The WAFL buffer stores one 4 KByte data block of a file in memory.

WAFL Inodes

Figure 6:
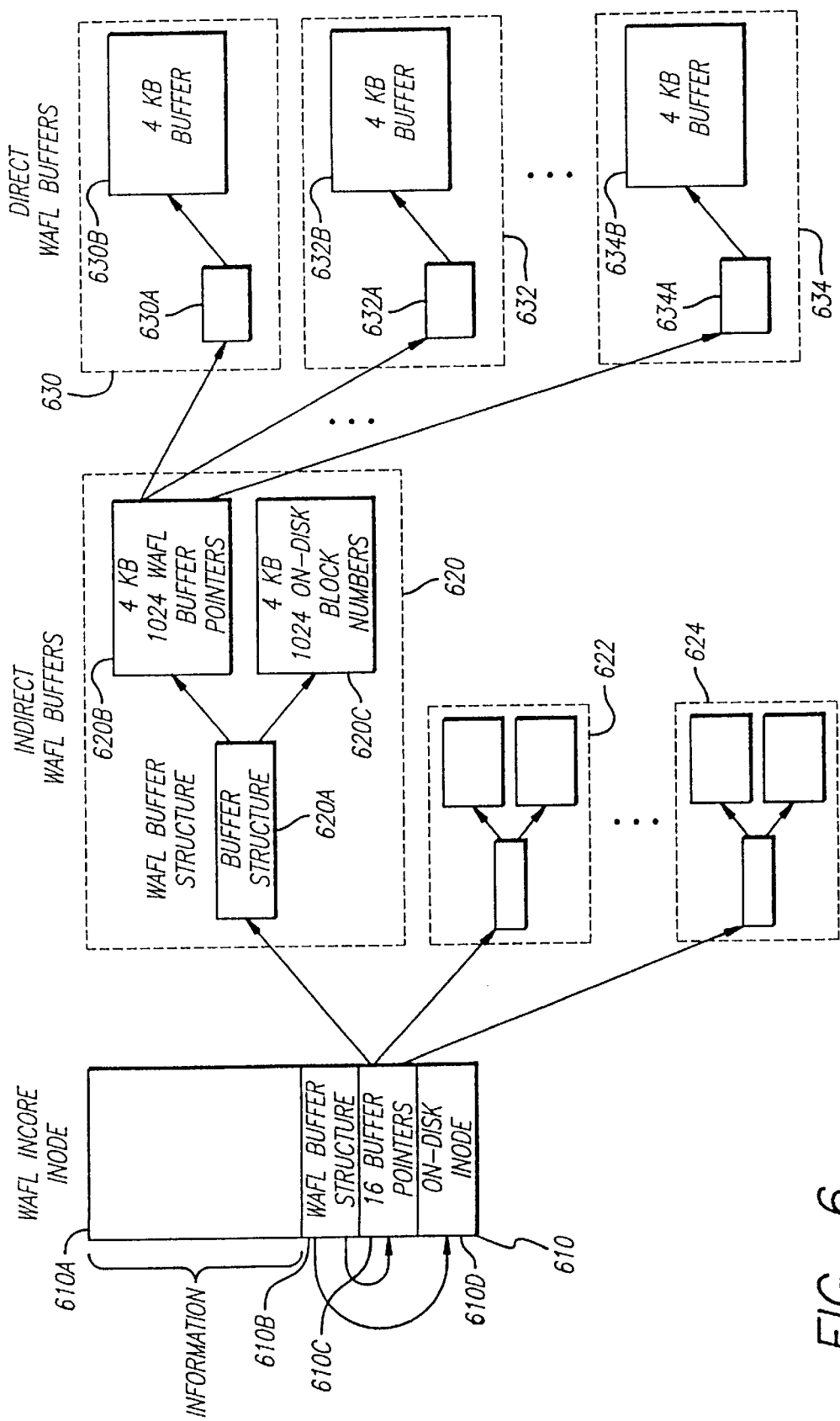
FIG. 6 is a drawing illustrating a tree of buffers referenced by a WAFL inode.

FIG. 6 is a diagram illustrating a file referenced by a WAFL inode 610. The file comprises indirect WAFL buffers 620–624 and direct WAFL buffers 630–634. The WAFL in-core inode 610 comprises standard inode information 610A (including a count of dirty buffers), a WAFL buffer data structure 610B, 16 buffer pointers 610C and a standard on-disk inode 610D. The in-core WAFL inode 610 has a size of approximately 300 bytes. The on-disk inode is 128 bytes in size. The WAFL buffer data structure 610B comprises two pointers where the first one references the 16 buffer pointers 610C and the second references the on-disk block numbers 610D.

Each inode 610 has a count of dirty buffers that it references. An inode 610 can be put in the list of dirty inodes and/or the list of inodes that have dirty buffers. When all dirty buffers referenced by an inode are either scheduled to be written to disk or are written to disk, the count of dirty buffers to inode 610 is set to zero. The node 610 is then re-queued according to its flag (i.e., no dirty buffers). This inode 610 is cleared before the next inode is processed.

The WAFL buffer structure is illustrated by indirect WAFL buffer 620. WAFL buffer 620 comprises a WAFL buffer data structure 620A, a 4 KB buffer 620B comprising 1024 WAFL buffer pointers and a 4 KB buffer 620C comprising 1024 on-disk block numbers. Buffer 620C contains an in-memory copy of the associated on-disk indirect block. The 1024 pointers of buffer 620C are filled in as child blocks are loaded into buffers 620 in the cache. The WAFL buffer data structure is 56 bytes in size and comprises 2 pointers. One pointer of WAFL buffer data structure 620A references 4 KB buffer 620B and a second pointer references buffer 620C. In FIG. 6, the 16 buffer pointers 610C of WAFL inode 610 point to the 16 single-indirect WAFL buffers 620–624. In turn, WAFL buffer 620 references 1024 direct WAFL buffer structures 630–634. WAFL buffer 630 is representative of direct WAFL buffers.

Direct WAFL buffer 630 comprises WAFL buffer data structure 630A and a 4 KB direct buffer 630B containing a cached version of a corresponding on-disk 4 KB data block. Direct WAFL buffer 630 does not comprise a 4 KB buffer such as buffer 620C of indirect WAFL buffer 620. The second buffer pointer of WAFL buffer data structure 630A is zeroed, and therefore does not point to a second 4 KB buffer. This prevents inefficient use of memory because memory space would be assigned for an unused buffer otherwise.

In the WAFL file system shown in FIG. 6, a WAFL in-core inode structure 610 references a tree of WAFL buffer structures 620–624 and 630–634. It is similar to a tree of blocks on disk referenced by standard inodes comprising block numbers that pointing to indirect and/or direct blocks. Thus, WAFL inode 610 contains not only the on-disk inode 610D comprising 16 volume block numbers, but also comprises 16 buffer pointers 610C pointing to WAFL buffer structures 620–624 and 630–634. WAFL buffers 630–634 contain cached contents of blocks referenced by volume block numbers.

The WAFL in-code inode 610 contains 16 buffer pointers 610C. In turn, the 16 buffer pointers 610C are referenced by a WAFL buffer structure 610B that roots the tree of WAFL buffers 620–624 and 630–634. Thus, each WAFL inode 610 contains a WAFL buffer structure 610B that points to the 16 buffer pointers 610C in the inode 610. This facilitates algorithms for handling trees of buffers that are implemented recursively (described below). If the 16 buffer pointers 610C in the inode 610 were not represented by a WAFL buffer structure 610B, the recursive algorithms for operating on an entire tree of buffers 620–624 and 630–634 would be difficult to implement.

List of Inodes Having Dirty Blocks

Figure 7:
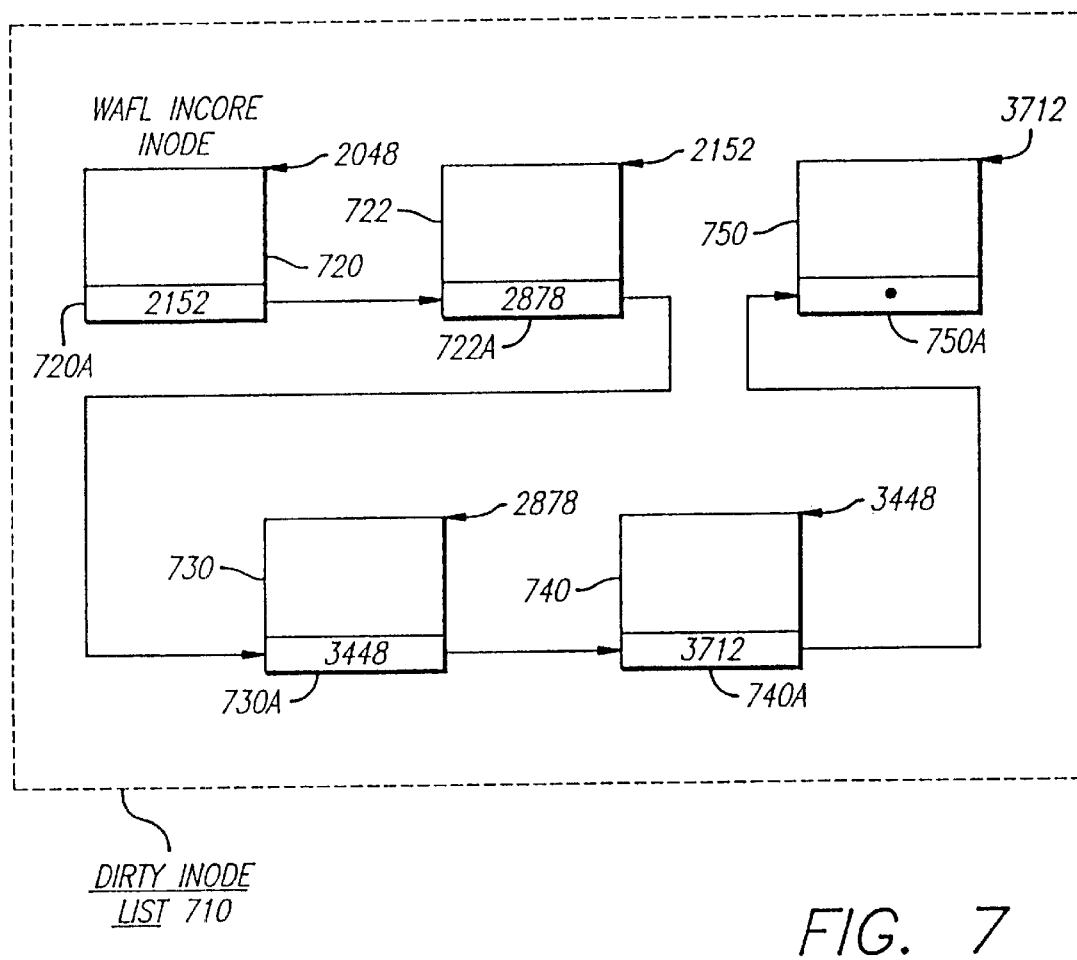
FIG. 7 is a drawing illustrating a list of dirty inodes.

WAFL in-core inodes (i.e., WAFL inode 610 shown in FIG. 6) of the WAFL file system are maintained in different linked lists according to their status. Inodes that contain dirty data are kept in a dirty inode list as shown in FIG. 7. Inodes containing valid data that is not dirty are kept in a separate list and inodes that have no valid data are kept in yet another, as is well-known in the art. The present invention utilizes a list of inodes having dirty data blocks that facilitates finding all of the indoes that need write allocations to be done.

FIG. 7 is a diagram illustrating a list 710 of dirty inodes according to the present invention. The list 710 of dirty inodes comprises WAFL in-core inodes 720–750. As shown in FIG. 7, each WAFL in-core inode 720–750 comprises a pointer 720A–750A, respectively, that points to another inode in the linked list. For example, WAFL inodes 720–750 are stored in memory at locations 2048, 2152, 2878, 3448 and 3712, respectively. Thus, pointer 720A of inode 720 contains address 2152. It points therefore to WAFL inode 722. In turn, WAFL inode 722 points to WAFL inode 730 using address 2878. WAFL inode 730 points to WAFL, inode 740. WAFL inode 740 points to inode 750. The pointer 750A of WAFL inode 750 contains a null value and therefore does not point to another inode. Thus, it is the last inode in the list 710 of dirty inodes.

Each inode in the list 710 represents a file comprising a tree of buffers as depicted in FIG. 6. At least one of the buffers referenced by each inode 720–750 is a dirty buffer. A dirty buffer contains modified data that must be written to a new disk location in the WAFL system. WAFL always writes dirty buffers to new locations on disk. While the list 710 of dirty inodes in FIG. 7 is shown as a singly-linked list, it should be obvious to a person skilled in the art that the list 710 can be implemented using a doubly-linked list or other appropriate data structure.

In contrast to the WAFL system, FFS keeps buffers in a cache that is hashed based on the physical block number of the disk block stored in the buffer. This works in a disk system where disk space is always allocated for new data as soon as it is written. However, it does not work at all in a system such as WAFL where a megabyte (MB) or more of data may be collected in cache before being written to disk.

File Allocation Algorithms

Figure 1:
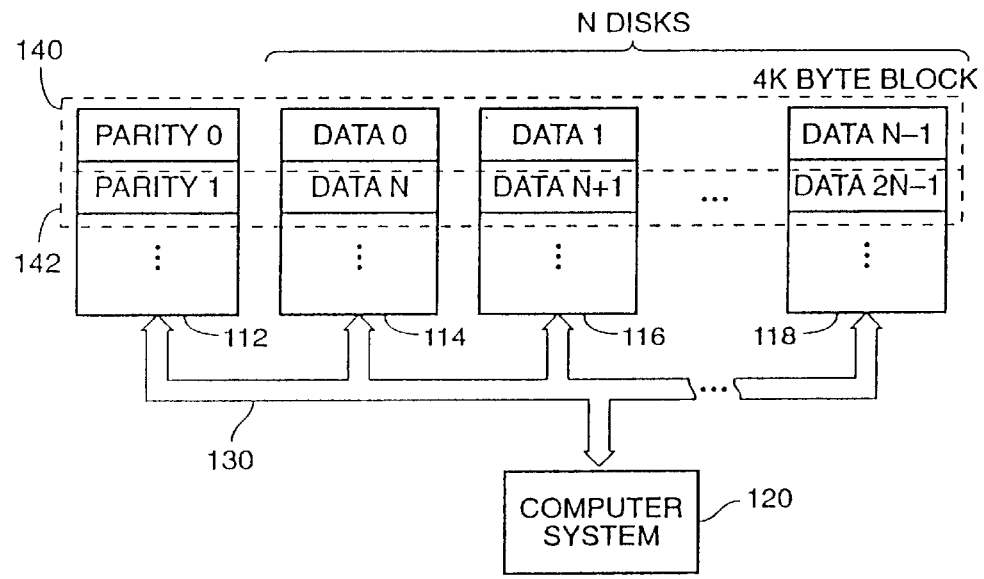
FIG. 1 is a block diagram of a prior art Raid level 4 subsystem.
Figure 2:
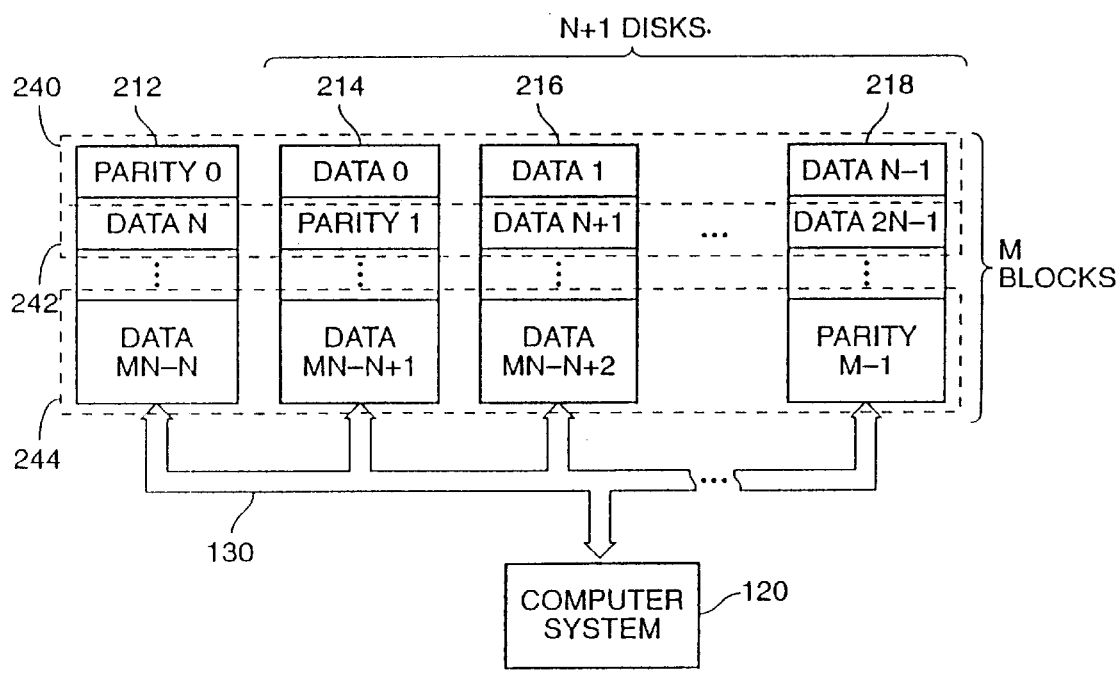
FIG. 2 is a block diagram of a prior art Raid level 5 subsystem.
Figure 3:
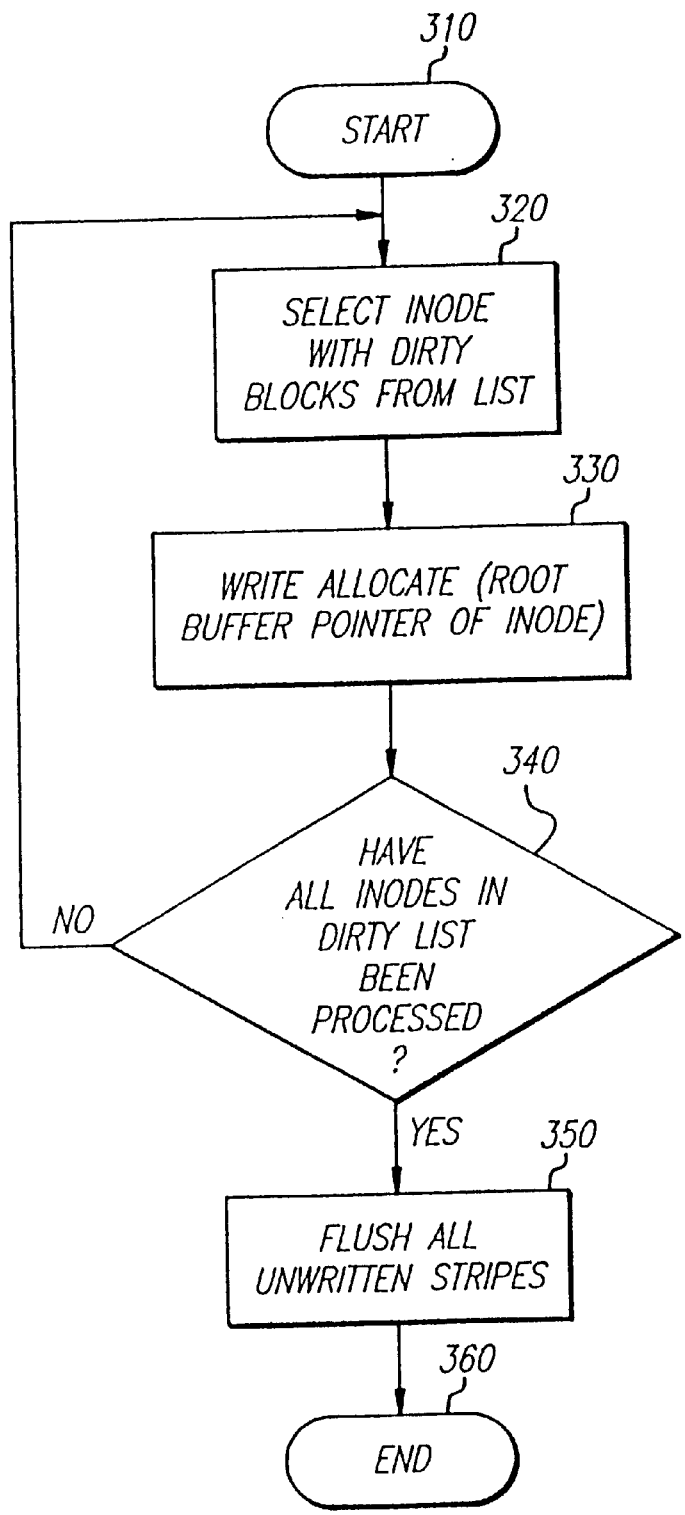
FIG. 3 is a flowchart illustrating the present invention for allocating files using a RAID array integrated with the WAFL file system.

FIG. 3 is a flow diagram illustrating the file allocation method of the present invention. The algorithm begins at start step 310. In step 320, an inode is selected with dirty blocks from the list of inodes having dirty blocks. In step 330, the tree of buffers represented by the inode are write-allocated to disk. In decision block 340, a check is made to determine if all inodes in the dirty list have been processed. If decision block 340 returns false (No), execution continues at step 320. However, when decision block 340 returns true (Yes), execution continues at step 350. Ins step 350, all unwritten stripes are flushed to disk. The algorithm terminates at step 360. When files stored in cache are selected for allocation, directories are allocated first. Next, files are allocated on a least-recently-used (LRU) basis.

Figure 4:
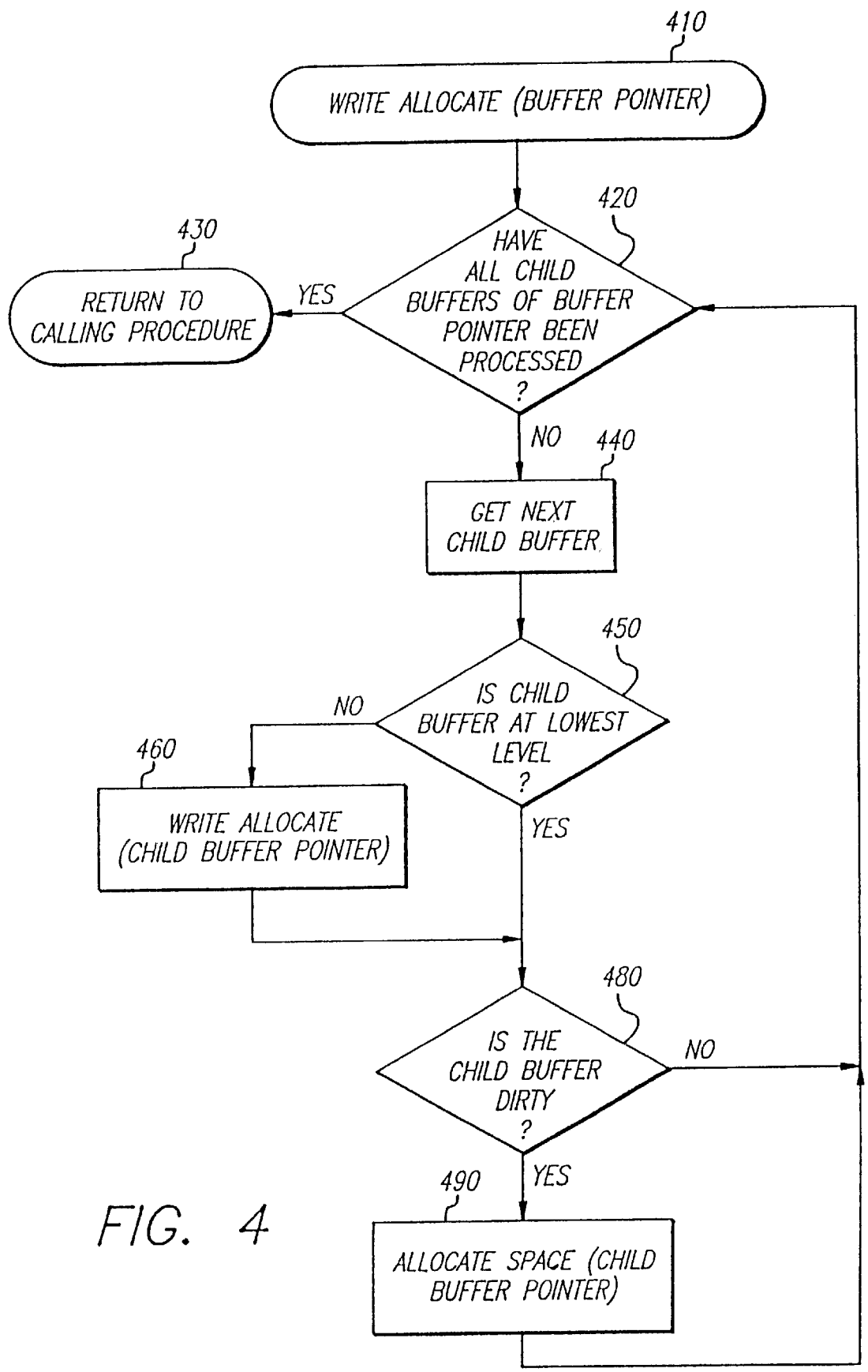
FIG. 4 is a flowchart illustrating step 330 of FIG. 3.

FIG. 4 is a flow diagram illustrating step 330 of FIG. 3 for write allocating buffers in a tree of buffers to disk. In step 330 of FIG. 3, the tree of buffers referenced by an inode is write-allocated by calling algorithm Write Allocate (root buffer pointer of inode). The pointer in buffer data structure 610B of WAFL inode 610 that references 16 buffer pointer 610C is passed to the algorithm. In FIG. 4, the algorithm begins in step 410. Step 410 indicates that a buffer pointer is passed to algorithm Write Allocate algorithm. In decision block 420, a check is made to determine if all child buffers of the buffer pointer have been processed. When decision block 420 returns true (yes), system execution continues at step 430. In step 430, the recursive algorithm returns to the calling procedure. Thus, the Write Allocation algorithm may return to decision block 340 of the calling procedure illustrated in FIG. 3. Alternatively, it may return to decision block 480 of FIG. 4 when called recursively (described below).

When decision block 420 returns false (no), system execution continues at step 440. In step 440, the next child buffer of the buffer that is referenced by the buffer pointers obtained. In decision block 450, a check is made to determine if the child buffer is at the lowest level. When decision block 450 returns false (no), system execution continues at step 460. In step 460, the write allocate algorithm is recursively called using the child buffer pointer. System execution then continues at decision block 480. When decision block 450 returns true (yes), system execution continues at step 480.

In decision block 480, a check is made to determine if the child buffer is dirty. When decision block 480 returns true (yes), system execution continues at step 490. In step 490, disk space is allocated for the child buffer by calling the algorithm Allocate Space (child buffer pointer). System execution then continues at decision block 420. When decision block 480 returns false (no), system execution continues at decision block 420. The algorithm illustrated in FIG. 4 performs a depth-first post-visit traversal of all child buffers allocating new disk space for the dirty ones. Post-visit traversal is required because allocating space for a child buffer changes the parent buffer.

Figure 5:
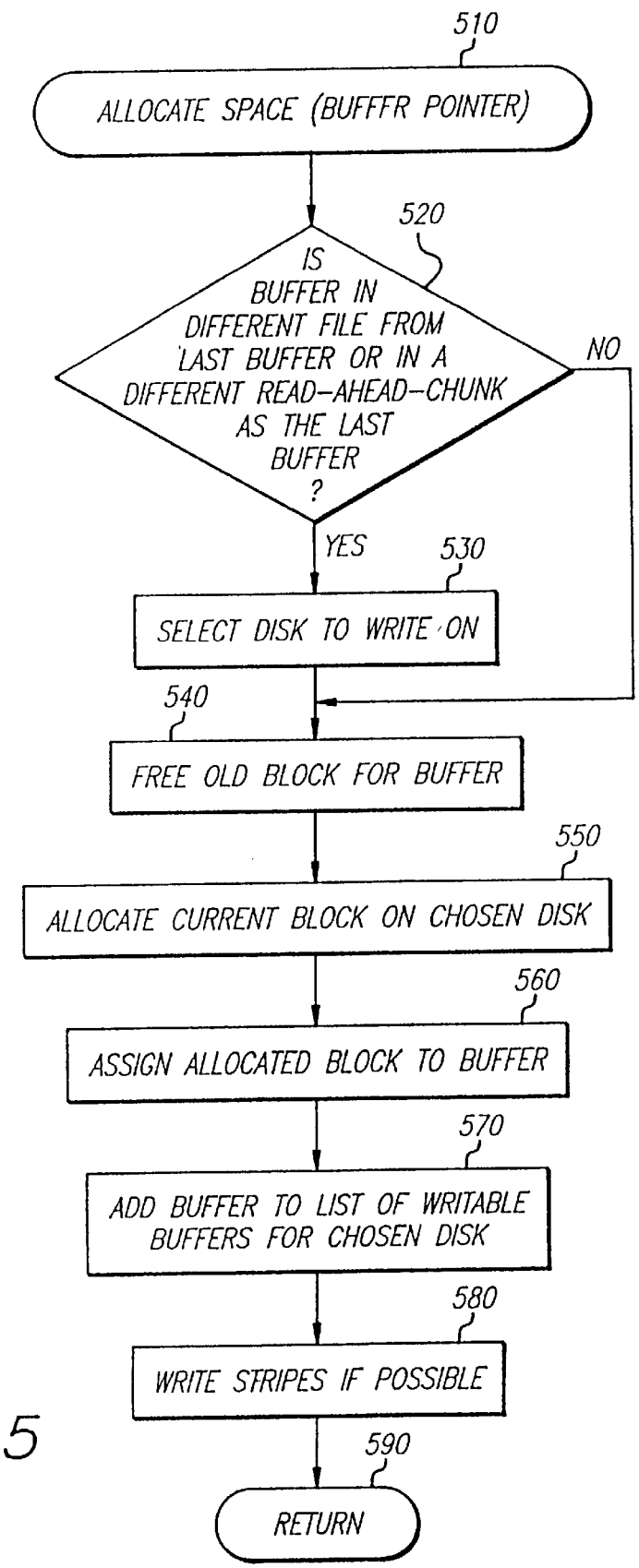
FIG. 5 is a flowchart illustrating step 490 of FIG. 4.

FIG. 5 is a flow diagram illustrating step 490 of FIG. 4 for allocating space on disk. In step 510, the algorithm for allocating space is passed the buffer pointer of a buffer that is being allocated disk space. In decision block 520, a check is made to determine if the buffer is made in a different file from the last buffer or is in a different read-ahead chunk than the last buffer. When decision block 520 returns true (yes), system execution continues at step 530. In step 530, the disk to be written on is selected. The disk to be selected on is chosen by looking at the lowest current-write-location (CWL) pointer for all the disks. The default disk that is to be written on is the one that has the lowest pointer value. System execution then continues at step 540.

In step 540, the old block assigned to the buffer is freed. The old block for the buffer is freed by updating the block map (blkmap) file so that the entry for the specified block indicates that the block is no longer used by the active file system. This is accomplished by clearing (0) bit zero of the entry in the blkmap file for the specified block. In step 550, a current block on the chosen disk is allocated. This accomplished by marking the CWL pointer for the default disk to be written on as allocated in the blkmap file, and scanning the blkmap file to find the next CWL pointer to a block for the chosen disk. Step 550 returns the newly allocated block to the algorithm illustrated in FIG. 5.

In step 560, the allocated block on disk is assigned to the buffer. In step 570, the buffer is added to a list of writable buffers for the chosen disk. In step 580, the stripes are written if possible. Step 580 checks the disk buffer queues for buffers that are part of a complete strip. It sends the buffers down to the RAID sub-system as a group to be written together as efficiently as possible. In step 590, the algorithm returns to the calling algorithm.

Steps 530–550 use free block management functions. These functions maintain set of global variables that keep track of the disk that is currently being written on and what the next free block on each disk is. They also update blkmap file entries as blocks are freed and allocated. When the file system starts, the CWL pointer is initialized to point to the first free block on the disk. As free blocks are used, the CWL pointer is advanced through the disk until the end of the disk is reached. At this point the selection wraps around to the first free block on the disk.

Steps 560–580 are disk input/output (I/O) functions. These functions manage the I/O operations of each disk. Each disk has a queue of buffers waiting to be written to the disk. Buffers are released from the queues and written to the disk I/O sub-system as complete stripes are generated. A stripe is complete as soon as the CWL pointer value of all the disks has passed the blocks of the stripe. That is if there are three data disks with CWL pointers having values of 231, 228 and 235, then all stripes below the lowest value of 228 are complete.

As discussed above with reference to FIGS. 3 and 4, the Allocate Space algorithm illustrated in FIG. 5 is called for every dirty buffer that is processed. The algorithms in FIGS. 3 and 4 process one file at a time, and each file is processed sequentially. Thus, the Allocate Space algorithm for dirty buffers is not called randomly, but instead is called for the plurality of dirty buffers of each file.

The present invention satisfies two constraints when allocating disk groups of blocks in a RAID array. The first constraint is to allocate successive blocks for each individual file on the same disk in order to improve read-ahead performance. A second constraint is to allocate all free blocks in a stripe simultaneously in order to improve the write performance of the RAID array.

The algorithm satisfies the first constraint by choosing a particular file for allocation, selecting a disk in the RAID array to allocate the dirty blocks of the file on, and allocating successive free blocks on the disk for successive dirty blocks of the file. The algorithm satisfies the second constraint by keeping the current-write-location for each disk starting at zero and incrementing the current-write-location as block allocations occur until it reaches the end of the disk. By keeping the current-write-locations of all the disks in the RAID array close together, blocks in the same stripe tend to be allocated at about the same time. One method of keeping the current-write-locations close to each other is to always allocate blocks o the disk with the lowest current-write-location.

A backlog of requests is required in order to send blocks down to RAID a stripe at a time because disks often do not have the same current-write-location. Therefore, each disk has a queue of buffers to be written. Any buffers having on-disk block numbers less than the minimum current-write-location of all the disks are eligible to be written. The present invention scans all disks of the RAID array for blocks with the same current-write-location of all the disks are eligible to be written. The present invention scans all disks of the RAID array for blocks with the same current-write-location (i.e., buffers in the same stripe) so that it can send buffers down to the RAID sub-system a stripe at a time. This is described in greater detail below.

Processing of Inodes Having Dirty Buffers

The list 710 of dirty inodes illustrated in FIG. 7 is processed as follows according to the flow diagram in FIG. 3. In step 320, WAFL inode 720 is selected from the list 710 of dirty inodes. The tree of buffers referenced by WAFL in-code inode 720 is write-allocated in step 330. In decision block 340, a check is made to determine if all inodes in the list 710 of dirty inodes have been processed. Decision block 340 returns false (no), and execution continues at step 320. In step 320, the next inode 722 having dirty buffers is selected. Inode 722 is referenced by the previous inode 720 in the list 710. In step 330, the tree of buffers referenced by WAFL in-code inode 722 is write-allocated. In decision block 340, a check is made to determine if all inodes in the list 710 of dirty inodes have been processed. Decision block 340 returns false (no). Thus, inodes 730 and 740 are processed in a similar manner. After inode 740 is write allocated to disk in step 330, decision block 340 checks if all inodes in the dirty list have been processed. Decision block 340 returns false (no) and execution continues at step 320.

In step 320, inode 750 that is pointed to by inode 750 is write allocated to disk. In decision block 340, a check is made to determine if all inodes in the list 710 of dirty inodes have been processed. The pointer 750A is empty. Thus, inode 750 does not point to another inode in list 710. Decision block 340 returns true (yes) and system execution continues at step 350. In step 350, all unwritten stripes are flushed to disk. Thus, in step 350, when all dirty inodes 720–750 in the list 710 of dirty inodes have been write-allocated, any queued buffers and incomplete stripes are forced out to disk, as described below. In step 360, the algorithm terminates.

Write Allocating a Tree of Buffers

Figure 8:
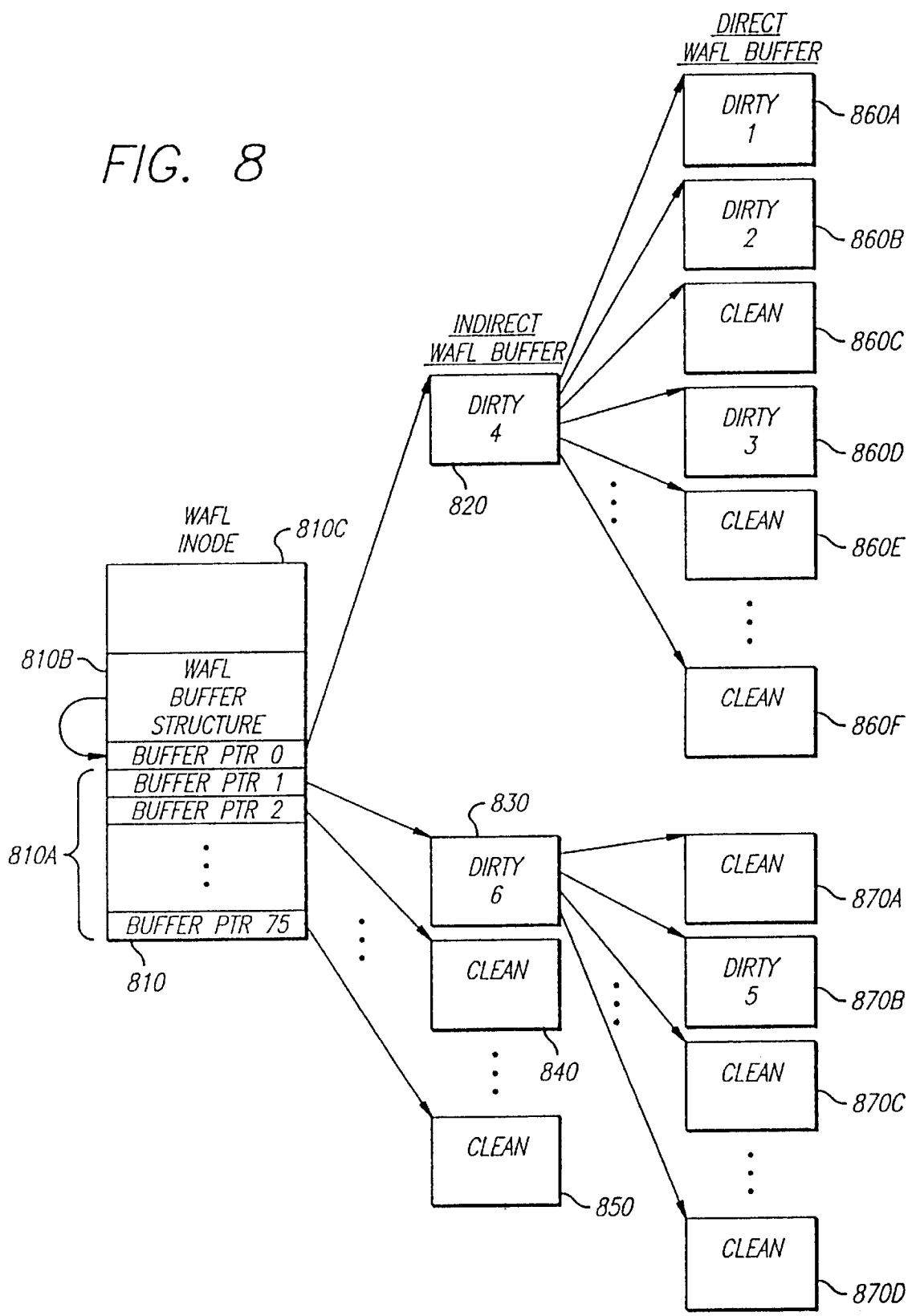
FIG. 8 is a diagram illustrating allocation of a tree of buffers referenced by inode 720 in FIG. 7.

FIG. 8 is a diagram illustrating allocation of a tree of buffers 820–850, 860A–860F and 870A–870D that is referenced by inode 810. In FIG. 8, inode 720 of FIG. 7 is relabeled WAFL inode 810. WAFL inode 810 comprises 16 buffer pointers 810A and a WAFL buffer data structure 810B that references the 16 buffer pointers 810A. In FIG. 8, indirect buffers 820 and 830 are dirty, whereas indirect buffers 840–850 are clean. Similarly, direct buffers 860A–860B and 860D are dirty. Direct buffer 870B is also dirty. All other buffers are clean. The diagram includes simplified versions of the WAFL buffers shown in FIG. 6. The simplified diagram in FIG. 8 is used to illustrate the algorithm shown in FIG. 5.

In FIG. 8, the WAFL inode 810 references a tree of WAFL buffers 820–850, 860A–860F and 870A–870D. The 16 buffer pointers 810A of WAFL inode 810 are referenced by WAFL buffer structure 810B. In turn, buffer pointer 810A reference indirect WAFL buffers 820–850, respectively. In FIG. 8, buffer pointers 810A reference dirty WAFL buffer 820, dirty WAFL buffer 830, clean WAFL buffer 840 and clean WAFL buffer 850. Each of the indirect WAFL buffers comprise 1024 buffer pointers that reference 1024 direct WAFL buffers (as well as on-disk volume block numbers 620C shown in FIG. 6). Indirect WAFL buffer 820 references direct WAFL buffers 860A–860F Direct WAFL buffers 860A–860B and 860D are dirty. Direct WAFL buffers 860C and 860E–860F referenced by indirect WAFL buffer 820 are clean. Direct WAFL buffer 870B referenced by indirect WAFL buffer 830 is also dirty. Direct WAFL buffers 870A and 870C–870D.

The depth-first post-visit traversal of all child buffers while allocating new blocks for dirty WAFL buffers is described with reference to FIG. 4. In step 410, the Write Allocate algorithm is passed the buffer pointer of WAFL buffer structure 810B of the WAFL inode 810 that references the 16 buffer pointers 810A of WAFL inode 810. In decision block 420, a check is made to determine if all child buffers (in this case, indirect WAFL buffers 820–850) of the buffer pointer contained in the WAFL buffer structure 810B have been processed. Decision block 420 returns false (no). In step 440, indirect WAFL buffer 820 is obtained as a child buffer of the WAFL buffer pointer in 810B. In decision block 450, a check is made to determine if indirect WAFL buffer 450 is at the lowest level remaining in the tree. When decision block 450 returns false (no), system execution continues at step 460. In step 460, a call is made to the Write Allocate algorithm by passing the buffer pointer of indirect WAFL buffer 820. Thus, the Write Allocate algorithm is recursively called.

In step 410, the Write Allocate algorithm is called by passing the buffer pointer for indirect WAFL buffer 820. In decision block 420, a check is made to determine if all direct WAFL buffers 860A–860F of indirect WAFL buffer 820 have been processed. Decision block 420 returns false (no). In step 440, direct WAFL buffer 860A is obtained. In decision block 450, a check is made to determine if direct WAFL buffer 860A is at the lowest level remaining in the tree. Decision block 450 returns true (yes), therefore system execution continues at decision block 480. In decision block 480, a check is made to determine if direct WAFL buffer 860A is dirty. Decision block 480 returns true since direct WAFL buffer 860A is dirty. In step 490, space is allocated for direct WAFL buffer 860A by passing the buffer pointer for WAFL buffer 860A to the Allocate Space algorithm described in FIG. 5. Once space is allocated for direct WAFL buffer 860A, system execution continues at decision block 420.

In decision block 420, a check is made again to determine if all child buffers of indirect WAFL buffer 820 have been processed. Decision block 420 returns false (no). In step 440, direct WAFL buffer 860B is obtained. In decision block 450, a check is made to determine if direct WAFL buffer 860B is at the lowest level remaining in the tree. Decision block 450 returns true (yes). In decision block 480, a check is made to determine if direct WAFL buffer 860B is dirty. Decision block 480 returns true (yes), therefore disk space is allocated for direct WAFL buffer 860B in step 490. Once the call to Allocate Space is completed in step 490, system execution continues at decision block 420.

In decision block 420, a check is made to determine if all child buffers of indirect WAFL buffer 820 have been processed. Decision block 420 returns false (no). In step 440, direct WAFL buffer 860C is obtained. In decision block 450, a check is made to determine if direct WAFL buffer 860C is the lowest level remaining in the tree. Decision block 450 returns true (yes). In decision block 480, a check is made to determine if direct WAFL buffer 860C is dirty. Decision block 480 returns false (no) since direct WAFL buffer 860 has not been modified and is therefore clean. System execution continues at decision block 420. This process of allocating space for a child buffer of indirect WAFL buffer 820 illustrated in FIG. 4 continues until direct WAFL buffer 860F ($1024^{th}$ buffer) is processed. Because direct WFL buffer 860F (the last child buffer of indirect WAFL buffer 820) is clean, decision block 480 returns false (no). Thus, execution continues at decision block 420. In decision block 420, a check is made to determine if all child buffers (direct WAFL buffers 860A–860F) of the indirect WAFL buffer 820 have been processed. Decision block 420 returns true (yes), therefore system execution returns to the calling algorithm in step 430.

In step 430, the algorithm returns to decision block 480 due to the recursive call. In decision block 480, a check is made to determine if the child buffer (indirect WAFL buffer 820) is dirty. Decision block 480 returns true (yes), thus execution continues at step 490. In step 490, disk space is allocated for indirect WAFL buffer 820 by calling the Allocate Space algorithm by passing the buffer pointer for indirect WAFL buffer 820. When the algorithm returns from step 490, execution continues at decision block 420.

In decision block 420, a check is made to determine if all child buffers (indirect WAFL buffers 820–850) of the buffer pointer contained in WAFL buffer structure 810B of WAFL inode 810 have been processed. Decision block 420 returns false (no). In step 440, indirect WAFL buffer 830 is obtained. In decision block 450, a check is made to determine if indirect WAFL buffer 830 is at the lowest level remaining in the tree. Decision block 450 returns false (no), therefore system execution continues at step 460. In step 460, the Write Allocate algorithm is called recursively by passing the buffer pointer for indirect WAFL buffer 830. System execution continues at step 410 of the algorithm illustrated in FIG. 4.

In step 410, the buffer pointer for indirect WAFL buffer 830 is passed to Write Allocate algorithm. In decision block 420, a check is made to determine if all child buffers (direct WAFL buffers 870A–870D) of indirect WAFL buffer 830 have been processed. Decision block 420 returns false (no), and system execution continues at step 440. In step 440, direct WAFL buffer 870A (child buffer of indirect WAFL buffer 830) is obtained. In decision block 450, a check is made to determine if direct WAFL buffer 870A is at the lowest remaining level in the tree. Decision block 450 returns true(yes), and system execution continues at decision block 480. In decision block 480, a check is made to determine if direct WAFL buffer 870A has been modified and is therefore a dirty child buffer. Decision block 480 returns false (no), since direct WAFL buffer 870A is clean. Therefore, system execution continues at decision block 420.

In decision block 420, a check is made to determine if all child buffers of indirect WAFL buffer 830 have been processed. Decision block 420 returns false (no), and execution continues at step 440. In step 440, direct WAFL buffer 870B is obtained. In decision block 450, a check is made to determine if direct WAFL buffer 870B is at the lowest level remaining in the tree. Decision block 450 returns true (yes), and system execution continues at decision block 480. In decision block 480, a check is made to determine if direct WAFL buffer 870B is a dirty buffer. Decision block 480 returns true (yes) and system execution continues at step 490. In step 490, disk space is allocated for direct WAFL buffer 870B by calling the Allocate Space algorithm using the buffer pointer for direct WAFL buffer 870B. System execution then continues at decision block 420.

The remaining clean direct WAFL buffers 870C–870D of parent indirect WAFL buffer 830 are processed by the algorithm shown in FIG. 4. Because the remaining direct WAFL buffers 870C–870D that are children of indirect WAFL buffer 830 are clean, disk space is not allocated for these buffers. When decision block 480 checks to determine if direct WAFL buffer 870B is dirty, it returns false (no). System execution then continues at decision block 420. In decision block 420, a check is made to determine if all child buffers (direct WAFL buffers 870A–870D) of indirect WAFL buffer 830 have been processed. Decision block 420 returns true (yes) and system execution continues at step 430. In step 430, system execution returns to the calling algorithm. Therefore, system execution continues at decision block 480.

In decision block 480, a check is made to determine if indirect WAFL buffer 830 is dirty. Decision block 480 returns true (yes), and execution continues at step 490. In step 490, disk space is allocated for indirect WAFL buffer 830 by calling Allocate Space algorithm and passing it the buffer pointer for indirect WAFL buffer 830. System execution then continues at decision block 420.

In decision block 420, a check is made to determine if all child buffers (indirect WAFL buffers 820–850) of the buffer pointer contained in WAFL buffer structure 810B of WAFL inode 810 have been processed. Thus, indirect WAFL buffers 840–850 are recursively processed by the Write Allocate algorithm, as described above, until indirect WAFL buffer 850 is processed.

When indirect WAFL buffer 850 is checked in decision block 480 if it is dirty, decision block 480 returns false (no) since indirect WAFL buffer 850 is clean. System execution continues at decision block 420. In decision block 420, a check is made to determine if all child buffers (indirect WAFL buffer 820–850) of the buffer pointer contained in the WAFL buffer structure 810B of WAFL inode 810 have been processed. Decision block 420 returns true (yes) and execution returns to the calling algorithm, in this case, the main algorithm illustrated in FIG. 3. Thus, the entire tree of buffers comprising indirect WAFL buffers 820–850 and direct WAFL buffers 860A–860F and 870A–870D that are referenced by WAFL inode 810 (inode 810 corresponds to WAFL inode 72 of the list 710 of dirty inodes in FIG. 7) is processed.

In FIG. 8, depth-first traversal of all buffers in the tree referenced by WAFL inode 810 is performed. In this manner, new disk space is allocated for dirty child buffers. As described above, indirect WAFL buffer 820 is visited first. The child buffers of indirect WAFL buffer 820 are then processed sequentially. Since direct WAFL buffers 860A–860F of indirect WAFL buffer 820 are at the lowest level remaining in the tree, they are processed sequentially. Direct WAFL buffer 860A is allocated disk space since it is a dirty child buffer. This is indicated by the numeral 1 contained within direct WAFL buffer 860A. Next, disk space is allocated for direct WAFL buffer 860B (indicated by numeral 2). Because direct WAFL buffer 860C is clean, it is not allocated disk space in step 490 of FIG. 4. In this manner the direct WAFL buffers 860A–860F are allocated disk space if they are dirty.

Once direct WAFL buffers 860A–860F of indirect WAFL buffer 820 are processed, indirect WAFL buffer 820 is allocated disk space. It is allocated disk space in step 490 since it is a dirty buffer. Similarly, direct WAFL buffer 870B is allocated disk space. Then the parent buffer (indirect WAFL buffer 830) of direct WAFL buffer 870B is allocated disk space. When completed, the sequence of allocating disk space for buffers is as follows: direct WAFL buffers 860A, 860B, and 860D; indirect WAFL 820; direct WAFL buffer 870B; and, indirect WAFL buffer 830.

Allocating Space on Disk for Dirty Buffers

Figure 9A:
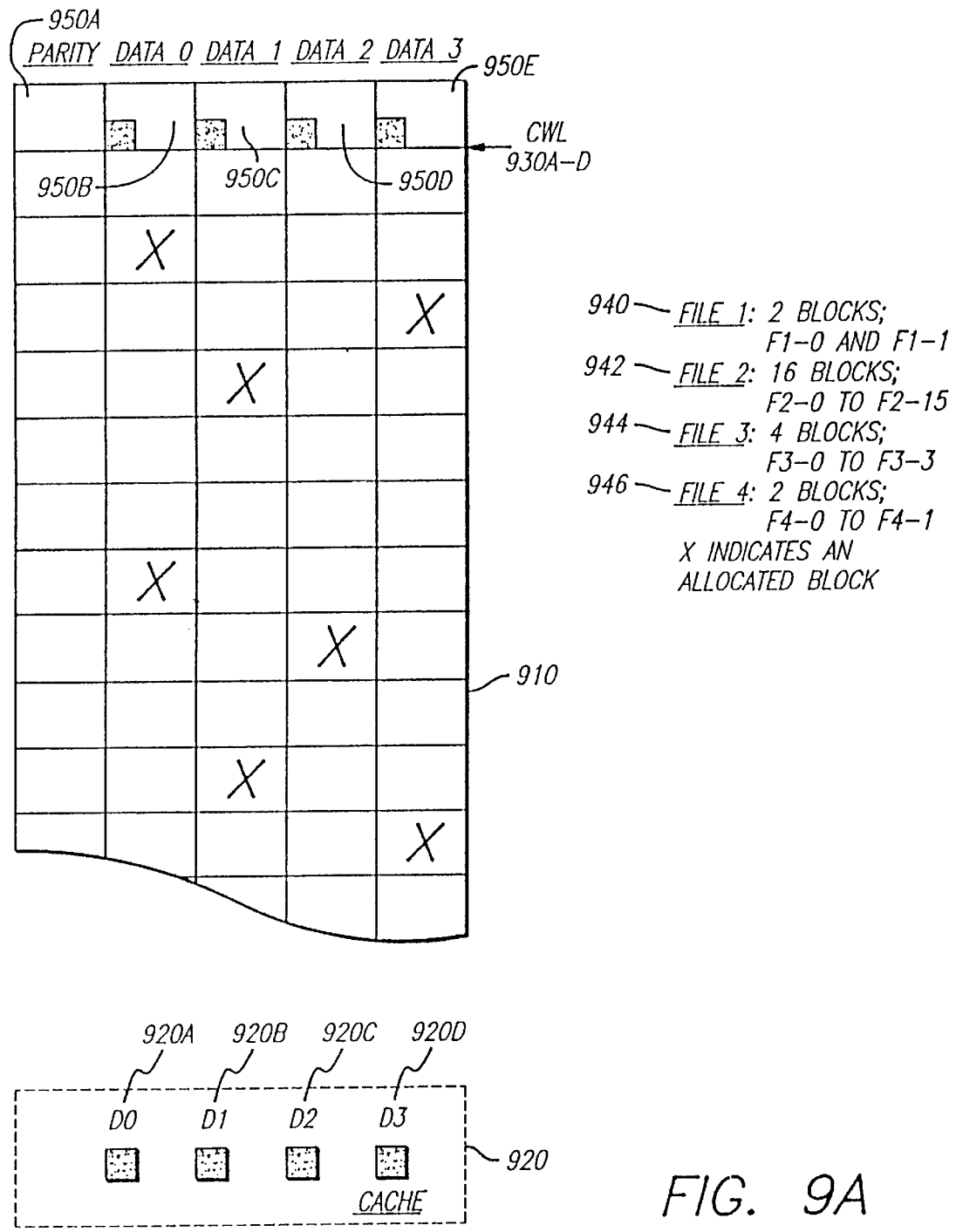

FIG. 9A illustrates cache 920 stored in memory and disk space 910 of the RAID array comprising the parity disk and data disks 0–3. The Allocate Space algorithm illustrated in FIG. 5 is discussed with reference to FIG. 9 for four files 940–946. Initially, the CWL pointers of data disks 0–3 are set to equal blocks. Current-write location pointers 930A–930D reference data blocks 950B–950E for data disk 0–3, respectively. In FIG. 9, four files 940–946 are contained in the cache 920. The first file 940 comprises two dirty blocks F1-0 and F1-1. The second file 942 comprises sixteen dirty blocks F2-0 to F2-15. The third file 944 comprises four dirty blocks F3-0 to F3-3. The fourth file 946 comprises two dirty blocks F4-0 and F4-1. In disk space 910 for data disks 0–3, an X indicates an allocated block. Also, shown in cache 920 are four disk queues 920A–920D for data disks 0–3, respectively.

Each of the four files 940–946 is referenced by an inode in a list 710 of dirty inodes as shown in FIG. 7. For example, in FIG. 7, inode 720 references the first file 940. The other inodes 722, 730, and 740 of list 710 of dirty inodes reference files 942–946, respectively. These inodes in the list 710 of dirty inodes are processed as described above. The following description discloses allocation of blocks on disk and writing stripes to disk according to FIG. 5.

As shown in FIG. 9A, the current-write locations 930A–930D of data disk 0–3 reference data block 950B–950E, respectively. This is indicated in block 950B–950E by a small box in the lower left-hand corner of the block. Similarly the queues 920A–920D of data disk 0–3 are empty as shown in FIG. 9A. In FIG. 9A, disk blocks containing an X indicates that the blocks are already allocated in disk space 910. Each vertical column represents a cylinder in disk space 910 for each data disks 0–3. The first file to be processed by the Allocate Space algorithm is file 940.

In step 510, the buffer pointer for buffer F1-0 file of file 940 is passed to the algorithm. In decision block 520, a check is made to determine if buffer F1-0 is in a different file from the last buffer or in a different read-ahead chunk than the last buffer. Decision block 520 returns true (yes) because buffer F1-0 is in a different file. In step 530, data disk 0 is selected to write on. In step 540, the previously allocated block of buffer F1-0 is freed. In step 550, data block 952 of data disk 0 is allocated on the chosen disk for buffer F1-0. Also, the CWL 930A is advanced to reference the next free location on disk. In step 560, disk block 952B is assigned to buffer F1-0 of file 940. In step 570, buffer F1-0 is added to the list 920A of writable buffers for data disk 0. In step 580, a check is made at the CWL to determine if it is in the lowest CWL in the file system. This is not true, so execution continues at step 590.

Figure 9B:
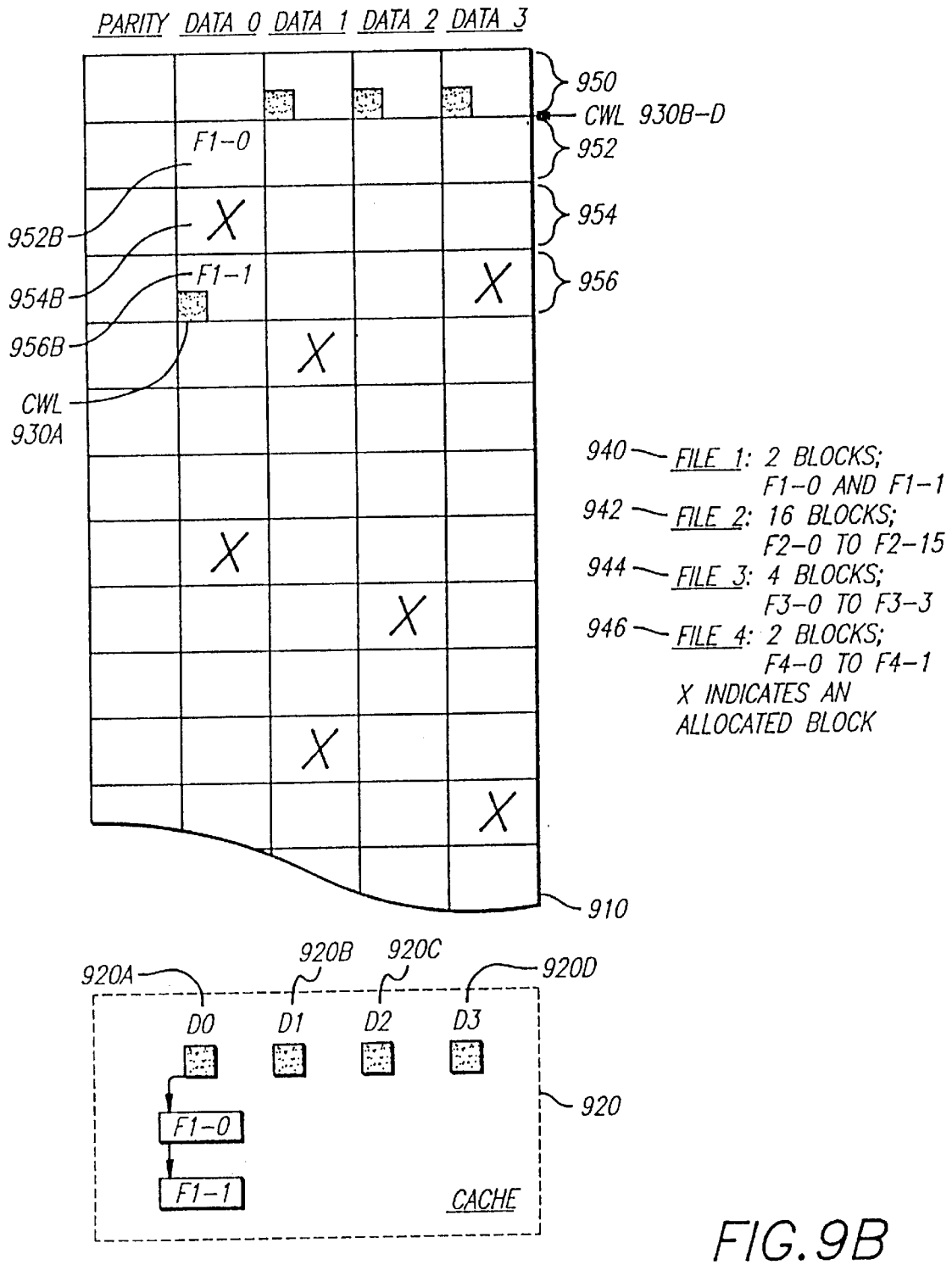

Because another buffer F1-1 is dirty in file 940, the Allocate Space algorithm is called again. System execution continues at step 510 where the pointer for buffer F1-1 is passed to the algorithm. In decision block 520, a check is made to determine if buffer F1-1 is in a different file from the last buffer (in this case, buffer F1-0) or in a different read-ahead chunk than the last buffer. Decision block 520 returns false (no), and system execution continues at step 540. Therefore, buffer F1-1 is written to the same disk as buffer F1-0. As shown in FIG. 9B, data block 954B is allocated, thus the next free block on data disk 0 that is available for allocation is block 956B. In step 540, the previously allocated block of buffer F1-1 is freed. In step 550, block 956B on data disk 0 is allocated for buffer F1-1. In step 560, a block 956B is assigned to buffer F1-1. In step 570, buffer F1-1 is assigned to the queue 920A of data disk 0. The CWL 930A of data disk 0 references block 956B of data disk 0. In step 580, a check is made to determine if a stripe is ready to be sent to disk, however a complete stripe is not available. System execution then continues at step 590.

As shown in FIG. 9B, the first file 940 is allocated disk space, however the buffers F1-0 and F1-1 are not written to disk. Instead, they are stored in memory in queue 920A of data disk 0.

In FIG. 9C, the next file 942 is allocated to disk space 910. The second file 942 comprises 16 dirty blocks F2-0 to F2-15. The first buffer F2-0 of file 942 is passed to the algorithm illustrated in step 510. In decision block 520, a check is made to determine if buffer F2-0 is in a different file from the last buffer (in this case, buffer F1-1) or in a different read-ahead chunk than the last buffer. Decision block 520 returns true (yes) because buffer F2-0 is in a different file. In step 530, data disk 1 is selected to be written on. In step 540, the previously allocated block is freed. In step 550, the block 952C is allocated on data disk 1. In step 560, block 952C is assigned to buffer F2-0 of file 942. In step 570, buffer F2-0 is added to the list 920B of writable buffer for data disk 1. In step 580, a check is made to determine if a stripe is available to be written to disk. However, a stripe is not available to be written to disk since the block being written to is not lower than the lowest CWL in the RAID array. Thus, the algorithm continues at step 510.

The algorithm illustrated in FIG. 4 passes a pointer for dirty file buffer for F2-1 to step 510 of FIG. 5. In decision block 520, a check is made to determine if buffer F2-1 is in a different file from the last buffer (F2-0) or in a different read-ahead chunk than the last buffer. Decision block 520 returns false (no), and system execution continues at a step 540. In step 540, block 954C is freed. In step 550 block 954C of data disk 1 is allocated. In step 560, block 954C is allocated to buffer F2-1. In step 570, buffer F2-1 is added to the list 920B of writable buffers for data disk 1. In step 580, the CWL 930B of data disk 1 is advanced to block 954C. A check is made to determine if a stripe is available to be written to disk. However, the CWL 930B of data disk 1 is not the lowest CWL pointer in the disk space 910. Thus, system execution continues at step 590.

Buffers F2-2 to F2-6 are allocated space on disk according to the algorithm illustrated in FIG. 5. When the Allocate Space algorithm is called for the eighth buffer F2-7, a check is made in decision block 520 if buffer F2-7 is in a different file from the last buffer (F2-6) or in a different reader head chunk than the last buffer. Decision block 520 returns false (no), and system execution continues at step 540. In step 540, block 968C is freed. In step 550, block 968C is allocated on data disk 1. In step 560, block 968C is assigned to buffer F2-7. In step 570, buffer F2-7 is added to the list 920B of writable buffers for data disk 1. In step 580, a stripe is written if possible. The CWL 930B of data disk 1 is advanced to block 970 since block 970 is already allocated. Because block 970C of data disk 1 is not the lowest CWL in the disk space 910, a stripe is not written to disk.

In step 510 of FIG. 5, the Allocate Space algorithm is called by passing the buffer pointer for buffer F2-8 of file 942. In decision block 520 a check is made to determine if buffer F2-8 is in a different file from the last buffer (F2-7) or in a different read-ahead chunk than the last buffer (F2-7). Because eight buffers F2-0 to F2-7 of file 942 were part of the previous read-ahead chunk and have been allocated space, decision block 520 returns true (yes). In step 530, data disk 2 is selected to be written on. This is illustrated in FIG. 9B.

In step 530, the algorithm selects a disk based by locating the disk having the lowest current-write location. If multiple disks have the same lowest current-write location, the first one located is selected.

In step 540, the previously allocated block of buffer F2-8 is freed. In step 550, 952D is allocated on data disk 2. In step 560, block 952D is assigned to buffer F2-8. In step 570, buffer F2-8 is added to the queue 920C of data disk 2. In step 580, a stripe is written if possible. However, a stripe is not ready to be flushed to disk for buffer F2-8. Execution continues as step 510.

In step 510, a pointer for buffer F2-9 of file 942 is passed to the Allocate Space algorithm. In decision block 520, a check is made to determine if buffer F2-9 is in a different file from the last buffer (F2-8) or in a different read-ahead chunk. Decision block 520 returns false (no) because buffer F2-9 is in the same file and read-ahead chunk as the last buffer F2-8. In step 540, block 954D of data disk 2 is freed for buffer F2-9. In step 550, block 954D is allocated on data disk 2. In step 560, block 954D of data disk 2 is assigned to buffer F2-9. In step 570, buffer F2-9 is added to the list 920C of writable buffers for data disk 2. In step 580, the algorithm attempts to write a stripe to disk, however a stripe is not available to be written to disk.

As shown in FIG. 9D, disk blocks 952D to 968D are allocated for buffers F2-8 to F2-15 of file 942. As blocks are allocated for the dirty buffers F2-8 to F2-15 according to the algorithm in FIG. 5, buffers F2-8 to F2-15 are added to the list 920C of writable buffers for data disk 2. In step 580, the system attempts to write a stripe to disk. However, a complete stripe is not available to be written. In step 590, system execution returns to the calling algorithm.

The third file referenced by an inode in the list 710 of dirty inodes is file 944. File 944 comprises four dirty blocks F3-0 to F3-3. The dirty buffers F3-0 to F3-3 of file 944 are processed by the algorithm Allocate Space. The allocation of dirty buffers of file 944 is described with reference to FIGS. 9E–9F. In step 510, Allocate Space algorithm is passed a buffer pointer for buffer F3-0 of file 944. In decision block 520, a check is made to determine if buffer F3-0 of file 944 is in a different file from the last buffer (buffer F2-15 of file 942) or in a different read-ahead chunk as the last buffer. Decision block 520 returns true (yes) because buffer F3-0 is in a different file. In step 530, data disk 3 having the lowest CWL (as illustrated in FIG. 9D for data block 950E) is selected as the disk to be written on. In step 540, the previously allocated block for buffer F3-0 is freed. This is accomplished by updating the entry in the blkmap file for block 952E to indicate that block 952E is no longer used by the active file system. In step 550, the current block 952E on data disk 3 is allocated This is accomplished by advancing the current-write location 930D of data disk 3 to data block 952E. In step 560, block 952E is assigned to buffer F3-0 of file 944. In step 570, buffer F3-0 is added to the list 920D of writable buffers for data disk 3.

In step 580, stripes are written to disk if possible. This is accomplished by checking the buffer queues 920A–920D of data disks 0–3 for a complete stripe. In FIG. 9E, a complete stripe is contained in the disk queues 920A–920D comprising buffers F1-0, F2-0, F2-8 and F3-0. These buffers are sent down to the RAID sub-system as a group to be written together as efficiently as possible. This is illustrated in FIG. 9E where stripe 980 is written to parity block 952A and data blocks 952B–952E of data disks 0–3, respectively. The stripe is illustrated as being enclosed within a dotted line. Thus, buffer F1-0 is written to disk in block 952B of data disk 0. Similarly, buffers F2-0, F2-8, and F3-0 are written to blocks 952C, 952D and 952E, respectively. As shown in FIG. 9E, the lowest current-write location 930D of data disk 3 is located in block 952E. As stripe 580 is written to disk, buffers F1-0, F2-0, F2-8 and F3-0 are removed from queues 920A–920D. This is illustrated in FIG. 9E. The algorithm then returns to the calling routine in step 590.

The buffer pointer of buffer F3-1 of file 944 is then passed to the Allocate Space algorithm in step 510. In decision block 520, a check is made to determine if buffer F3-1 is in a different file from the last buffer or in a different read-ahead chunk as the last buffer. Decision block 520 returns false (no) and system execution continues at step 540. In step 540, the previously-allocated block for buffer F3-1 is freed. In step 550, block 954E is allocated on data disk 3. The current-write location 930D of data disk 3 is advanced to block 956E in FIG. 9F from block 952E in FIG. 9E. The current-write location 930D is advanced to block 956E beyond the currently allocated block 954E, because block 956E is already allocated (indicated by the X in the block). In step 560, block 954E is assigned to buffer F3-1 of file 944. In step 570, buffer F3-1 is added to the list 920D of writable buffers for data disk 3. In step 580, two stripes 982 and 984 are written to disk. This occurs because the lowest current-write location 930A and 930D of data disks 0 and 3 reference data blocks 956B–956E. As shown in FIG. 9F, stripe 982 comprising buffers F2-1, F2-9 and F3-1 is written to blocks 954C to 954E. Stripe 984 is then written to disk as well. The corresponding buffers are removed from lists 920A–920D when stripes 982 and 984 are written to disk. In step 590, system execution returns to the calling algorithm.

Figure 9G:
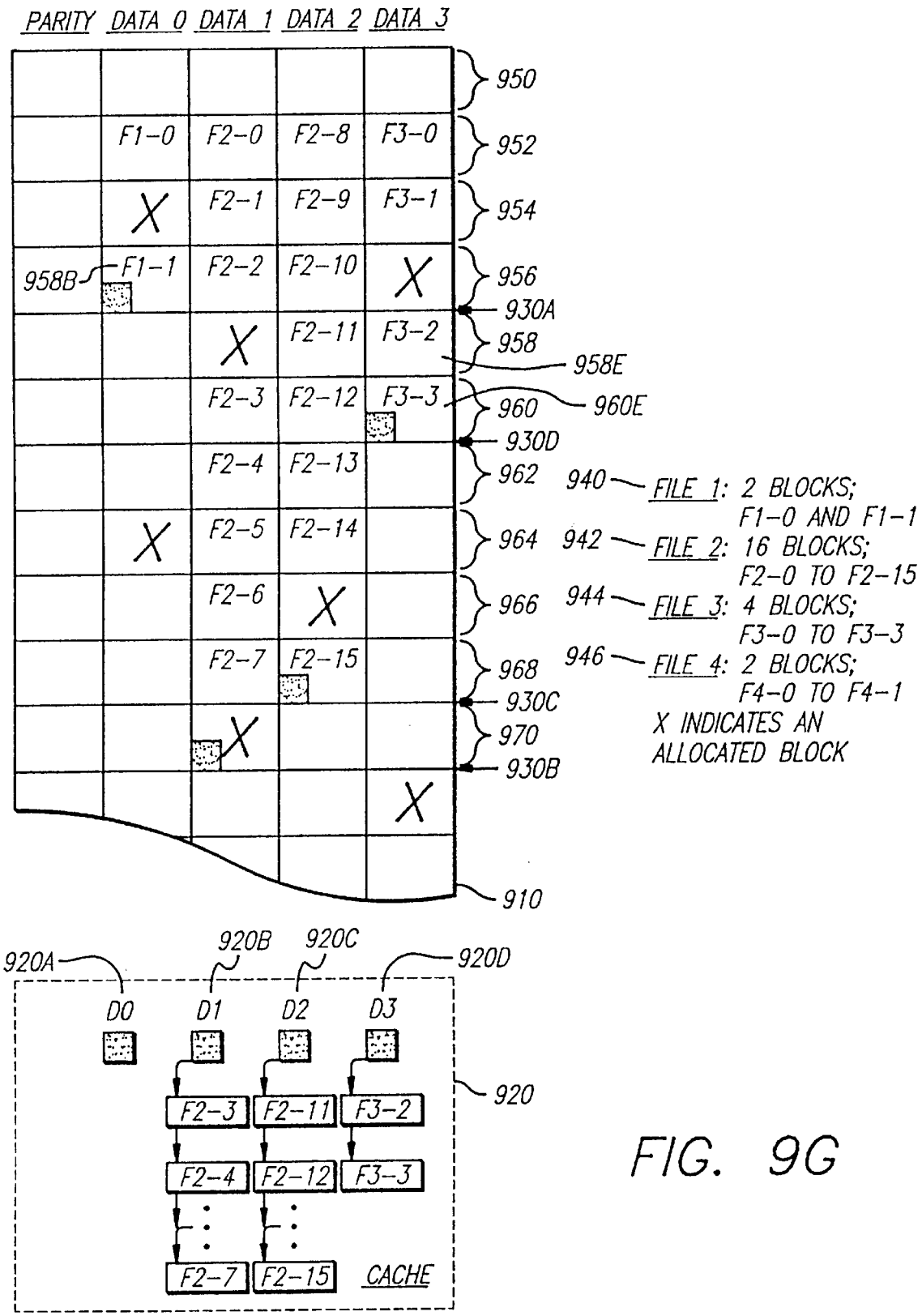

Similarly, buffers F3-2 and F3-3 of file 944 are allocated disk blocks 958E and 960E according to the algorithm shown in FIG. 5. Buffers F3-2 and F3-3 of file 944 are allocated to the list 920D of data disk 3 as shown in FIG. 9G. The current-write location 930D is advanced to block 960E of data disk 3 for file 944. As shown in FIG. 9G, the lowest current-write location is current-write location 930A of data disk 0 that references data block 956B. The other current-write locations 930B–930D reference blocks 970C, 968D and 960E of data disks 1–3. Further, as shown in FIG. 9G, the queue 920A of data disk 0 is empty. The list 920B of writable buffers for data disk 1 comprises buffers F2-3 to F2-7 of file 942. The list 920C of data disk 2 comprises the remaining dirty buffers F3-2 to F3-3 of file 944.

The fourth file 946 comprising dirty buffers F4-0 to F4-1 is allocated disk space using the algorithm illustrated in FIG. 5. In step 510, dirty buffer F4-0 of file 946 is passed to the Allocated Space algorithm. In decision block 520, a check is made if buffer F4-0 is in a different file from the last buffer (F3-3) or in a different read-ahead chunk as the last buffer. Decision block 520 returns true (yes) because buffer F4-0 is in a different file. In step 530, a check is made to determine the lowest current-write location in the disk space 910. As shown in FIG. 9G, the lowest current-write location is current-write location 930A that references block 956B of data disk 0. Thus, in step 530, data disk 0 is selected to write on. In step 540, the previously allocated block of buffer F4-0 of data disk 0 is freed. In step 550, block 958B is allocated on data disk 0. This advances the current write location 930A of data disk 0 from block 956B to block 958B. This is indicated in FIG. 9H by the solid square in the lower left-hand corner of FIG. 9H. In step 560, block 958B is assigned to buffer F4-0. In step 570, buffer F4-0 is added to the list 920A of writable buffers for data disk 0. In step 580, stripe 986 comprising buffers F4-0, F2-11 and F3-2 are written to disk, and the buffers are removed from queues 920A and 920C–920D, accordingly. In step 590, system execution returns to the calling algorithm.

Referring to FIG. 9I, dirty block F4-1 of file 946 is passed to the Allocate Space algorithm in step 510. In decision block 520, a check is made to determine if the buffer is in a different file from the last buffer or in a different file from the last buffer or in a different reader head chunk as the last buffer. Decision block 520 returns false (no) and system execution continues at step 540. In step 540, the previously allocated block is freed. In step 550, block 960B of data disk 0 is allocated. This advances the current-write location 930A of data disk 0 from block 958B to 960B. In step 560, allocated block 960B is assigned to buffer F4-1. In step 570, buffer F4-1 of file 946 is added to the list 920A of writable buffers for data disk 0. In step 580, stripe 988 is written to disk. This occurs because stripe 988 comprises blocks 960A–960E having the lowest current-write location 930A. Buffers F4-1, F2-3 F2-12 and F3-3 are removed from lists 920A–920D, respectively. In step 590, system execution returns to the calling algorithm.

As shown in FIG. 9I, the current-write locations 930A–930D of data disks 0–3 reference blocks 960B, 970C, 968D and 960E. Allocated blocks that are lower than the lowest current-write location 930A are flushed to disk in FIG. 9I. However, dirty buffers F2-4 to F2-7 and F2-13 to F2-15 of file 942 that have been added to lists 920B and 920C of data disks 1 and 2, respectively, are not flushed to disk.

FIG. 9J illustrates the flushing to disk of unwritten buffers F2-4 to F2-7 and F2-13 to F2-15 of file 944 when all dirty inodes have their blocks allocated. In this example, the current-write-locations 930A–930D of all data disks 0–3 are advanced to the highest current-write location 930B of FIG. 9I. Queues 920A–920D are accordingly emptied. Current-write-location 930B references block 970C of data disk 1. This operation is performed in step 350 of FIG. 3 that flushes all unwritten stripes to disk. In step 350, all buffers in queues 920A–920D of data disk 0–3 that have not been forced to disk are artificially forced to disk by advancing the current-write-locations 930A–930D to the largest one of the group.

As described above, the present invention uses explicit knowledge of disk layout of the RAID array to optimize write-allocations to the RAID array. Explicit knowledge of the RAID layout includes information about disk blocks and stripes of buffers to be written to disk. This is illustrated in FIGS. 9A–9J. The present invention integrates a file system with RAID array technology. The RAID layer exports precise information about the arrangement of data blocks in the RAID subsystem to the file system. The file system examines this information and uses it to optimize the location of blocks as they are written to the RAID system. It optimizes writes to the RAID system by attempting to insure good read-ahead chunks and by writing whole stripes.

Load-Sensitive Writing of Stripes

The method of write allocations to the RAID array for the WAFL file system described above is a "circular write" algorithm. This method cycles through the disk writing buffers to the RAID array so that all disk blocks of a stripe are allocated. The sequential writing of stripes is not dependent upon the number of free blocks allocated in the stripe other than at least one block must be free. In this manner, write allocation of stripes proceeds to the end of the disks in the RAID array. When the end of disk is reached, write allocation continues at the top of the disks.

An alternate embodiment of the present invention uses "load-sensitive circular writes" to handle disk writes when the rate of data writes to disk exceeds a nominal threshold level. When the rate of data writes exceeds the nominal threshold level, the present invention processes disk writes dependent upon the efficiency of writing a stripe. Some parts of a disk are better to write to than others dependent upon the pattern of allocated blocks in areas of each disk in the RAID array. For example, it is very efficient to write to stripes in the RAID array where there are no allocated blocks in a stripe on the data disks.

With RAID, disk writes become more efficient as more blocks in a stripe are written at once. This is because the cost of updating the parity block is shared among the blocks being written. For example, to write a single block in a stripe requires four disk operations: the current values for data and parity must be read, and the new values for data and parity must be written. Thus, a total of four disk operations are required to write one block of data. To write two blocks of data requires six disk operations: the parity and the two data blocks must be read, and the parity and the two data blocks must be written. Thus, writing two blocks takes three disk operations per block written, instead of the four required for one block. When more blocks per stripe are written, RAID becomes even more efficient. In the limit, N data blocks can be written with only N+1 disk operations.

In the load-sensitive method of circular writes, when the RAID sub-system is busy, inefficient stripes are skipped. Instead, stripes having a larger number of free blocks to write to are selected for allocation. Inefficient stripes are written to when the system is lightly loaded. This is done to save more efficient stripes for when the system is heavily loaded. Thus, unlike the circular write method that writes a particular set of dirty files and blocks in the same sequence, the load-sensitive circular write method changes its behavior dependent upon system loading. For example, in a RAID system having a maximal write rate of 5 megabytes/second, the present invention writes only to stripes having three or four free blocks when the system performs writes at an average rate of 2.5 megabytes per second in a ten second interval.

A large class of algorithms may be implemented to provide load-sensitive circular writes to provide more efficient operation of the file system with the underlying RAID disk system. It should be obvious to a person skilled in the art that providing information about the layout of the RAID array to a file system, as disclosed in the present invention, leads to a large class of algorithms that take advantage of this information.

In this manner, a method of allocating files in a file system using RAID arrays is disclosed.

What is claimed is:

1. A method for allocating files in a file system comprising:

a) selecting an inode having at least one dirty block from a list of inodes having dirty blocks;

b) write allocating blocks of data referenced by said inode to a storage means in a RAID array wherein said storage means comprises a plurality of storage blocks and add said blocks of data to a list of writeable blocks of data for said storage means;

c) determining if all nodes have been processed, when all of said inodes in said list of inodes have not been processed, continue repeating steps a–b; and, d) flushing all unwritten stripes to said RAID array.

2. The method of claim 1 wherein said blocks of data are stored in a cache.

3. The method of claim 1 wherein said blocks of data referenced by said inode is write allocated in a depth-first, post visit traversal of said blocks of data.

4. The method of claim 1 wherein said list of inodes comprises a first plurality of inodes for one or more directories and a second plurality of inodes for one or more files.

5. The method of claim 4 wherein each directory of said one or more directories is a specially formatted file.

6. The method of claim 4 wherein said first plurality of inodes for one or more directories are selected for write allocation before said second plurality of inodes for one or more files.

7. The method of claim 6 wherein said second plurality of inodes are write allocated on a least recently used basis.

* * * * *